US010997008B2

(12) United States Patent
Domeki

(10) Patent No.: US 10,997,008 B2
(45) Date of Patent: May 4, 2021

(54) CONTROLLER AND CONTROL SYSTEM THAT MANAGES EVENT OCCURRENCE HISTORY UTILIZING A FLASH CHAIN OF EVENT HISTORY DATA

(71) Applicant: Mitsubishi Electric Corporation, Tokyo (JP)

(72) Inventor: Eietsu Domeki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/644,165

(22) PCT Filed: Sep. 25, 2017

(86) PCT No.: PCT/JP2017/034575
§ 371 (c)(1),
(2) Date: Mar. 4, 2020

(87) PCT Pub. No.: WO2019/058560
PCT Pub. Date: Mar. 28, 2019

(65) Prior Publication Data
US 2020/0387421 A1    Dec. 10, 2020

(51) Int. Cl.
*G06F 11/07*        (2006.01)
*G06F 1/14*         (2006.01)
(Continued)

(52) U.S. Cl.
CPC ............ *G06F 11/0763* (2013.01); *G06F 1/14* (2013.01); *G06F 21/64* (2013.01);
(Continued)

(58) Field of Classification Search
CPC ............... G06F 11/1464; G06F 11/362; G06F 11/3648; G06F 11/3006; G06F 11/0766;
(Continued)

(56) References Cited
U.S. PATENT DOCUMENTS 8,549,320 B2 * 10/2013 Buettner ............. G06F 11/3648
713/187
2005/0190619 A1 * 9/2005 Wakiyama ............... G11C 7/24
365/201
(Continued)

FOREIGN PATENT DOCUMENTS

JP    2005-242871 A    9/2005
JP    2006-343790 A    12/2006
(Continued)

OTHER PUBLICATIONS

International Search Report and Written Opinion dated Dec. 26, 2017 for PCT/JP2017/034575 filed on Sep. 25, 2017, 9 pages including English Translation of the International Search Report.
(Continued)

*Primary Examiner* — Joseph O Schell
(74) *Attorney, Agent, or Firm* — Xsensus LLP

(57) ABSTRACT

A controller controls a control target device and includes: a storage unit to record event history data of an event occurring during operation of the controller; a hash value calculation unit to calculate a hash value on the basis of the event history data; and a communication unit to transmit the hash value to another controller external to the controller.

9 Claims, 14 Drawing Sheets

(51) Int. Cl.
*G06F 21/64* (2013.01)
*G06F 11/30* (2006.01)
*H04L 29/06* (2006.01)

(52) U.S. Cl.
CPC ...... *G06F 11/0766* (2013.01); *G06F 11/0787* (2013.01); *G06F 11/3006* (2013.01); *G06F 2201/86* (2013.01); *H04L 63/0428* (2013.01); *H04L 2209/38* (2013.01)

(58) Field of Classification Search
CPC ............. G06F 11/0784; G06F 11/0787; H04L 2209/38; H04L 9/083; H04L 63/0428
See application file for complete search history.

(56) References Cited

U.S. PATENT DOCUMENTS

| | | | | |
|---|---|---|---|---|
| 2007/0076593 | A1* | 4/2007 | Sakurai | B60W 50/0205 370/219 |
| 2009/0328218 | A1* | 12/2009 | Tsurukawa | H04L 9/3247 726/23 |
| 2010/0185847 | A1* | 7/2010 | Shasha | G06F 21/54 713/150 |
| 2011/0219235 | A1 | 9/2011 | Takahashi et al. | |
| 2011/0283149 | A1* | 11/2011 | Richmond | G06F 11/3006 714/39 |
| 2014/0298034 | A1* | 10/2014 | Watanabe | H04L 9/3236 713/176 |
| 2018/0276666 | A1* | 9/2018 | Haldenby | G06Q 20/20 |
| 2019/0014100 | A1* | 1/2019 | Scott | H04L 63/0807 |

FOREIGN PATENT DOCUMENTS

| | | |
|---|---|---|
| JP | 2008-134726 A | 6/2008 |
| JP | 2008-216342 A | 9/2008 |
| JP | 4235193 B2 | 3/2009 |
| JP | 2010-074338 A | 4/2010 |
| JP | 2011-188029 A | 9/2011 |
| WO | 2008/026238 A1 | 3/2008 |
| WO | 2013/054701 A1 | 4/2013 |

OTHER PUBLICATIONS

Notification of Reasons for Refusal received for Japanese Patent Application No. 2018-563928, dated Mar. 12, 2019, 15 pages including English Translation.

Notification of Decision to Grant a Patent received for Japanese Patent Application No. 2018-563928, dated Aug. 6, 2019, 5 pages including English Translation.

* cited by examiner

SEARCH REQUEST TRANSMISSION PROCESSING

CONTROLLER AND CONTROL SYSTEM THAT MANAGES EVENT OCCURRENCE HISTORY UTILIZING A FLASH CHAIN OF EVENT HISTORY DATA

CROSS-REFERENCE TO RELATED APPLICATIONS

The present application is based on PCT filing PCT/JP2017/034575, filed Sep. 25, 2017, the entire contents of which are incorporated herein by reference.

FIELD

The present invention relates to a controller that manages an event occurrence history, and a controller system.

BACKGROUND

Conventional devices such as programmable logic controllers (PLCs) record information on a history of occurrence of an event that occurs during operation. The event is predetermined device processing typified by reception of a notification of various pieces of information provided to a device in operation from an external device. The event in an PLC is exemplified by reception processing of a notification of a change in the state of a device to be controlled that is controlled by the PLC, the notification being provided from the device to be controlled to the PLC and including a notification of a change in a sensor value in the device to be controlled, a notification of a change in an output value in the device to be controlled, and a notification of occurrence of input/output that is out of tolerance in the device to be controlled.

PLCs have an available memory capacity that is extremely small compared to that of personal computers (PCs) or cloud computing. Moreover, PLCs have a small data capacity for event information and a small amount of computer resources such as a memory usage capacity and a calculation amount that a computer spends on recording the event information. For this reason, there has been a possibility that information recorded in a PLC can be easily falsified, or tampered with, from outside the PLC via a network.

Meanwhile, there is used a technique for verifying that data on an event occurrence history recorded in a device is correct by calculating a hash value of a current event while including a hash value of previous event information for each event that occurs during operation.

Patent Literature 1 discloses a technique for creating a hash value for each event information that occurs, generating a hash node that records the hash value created and the event information, and generating a hash node chain by chaining the nodes in the generated order. In verifying the event information, the technique of Patent Literature 1 evaluates the validity of the hash node chain using the hash value and the event information recorded in the hash node, and verifies whether or not the event information to be verified matches the associated event information recorded in the hash node.

CITATION LIST

Patent Literature

Patent Literature 1: Japanese Patent No. 4235193

SUMMARY

Technical Problem

However, according to the technique of Patent Literature 1, a hash value of one piece of event information is stored only in a single hash node chain storage server in an event history information storage system. In this case, when a stored hash value is falsified, there is a problem in that it is impossible to verify that the data on an event history recorded in the device is the correct data.

It is thus preferable to be able to verify that the data on the event history is the correct data by holding the hash value of the event information in multiple locations and spreading the risk of failing to verify that the data on the event history is the correct data when the hash value of the event information recorded is falsified. However, the technique of Patent Literature 1 does not disclose such risk spreading.

The present invention has been made in view of the above, and an object of the present invention is to provide a controller that can verify whether or not data on an event history is correct data even when a hash value of the event history stored in the controller is falsified.

Solution to Problem

In order to solve the above-described problems and achieve the object, a controller according to an aspect of the present invention is a controller for controlling a control target device, including: a storage unit to record event history data of an event that occurs during operation of the controller; a hash value calculation unit to calculate a hash value on a basis of the event history data; and a communication unit to transmit the hash value to another controller external to the controller.

Advantageous Effects of Invention

The controller according to the present invention produce an effect in that it is possible to verify whether or not data on an event history is correct data even when a hash value of the event history stored in the controller is falsified.

DESCRIPTION OF EMBODIMENT

A controller and a controller system according to embodiments of the present invention will be described below in detail with reference to the drawings. Note that the present invention is not limited to the embodiments.

First Embodiment

Figure 1:
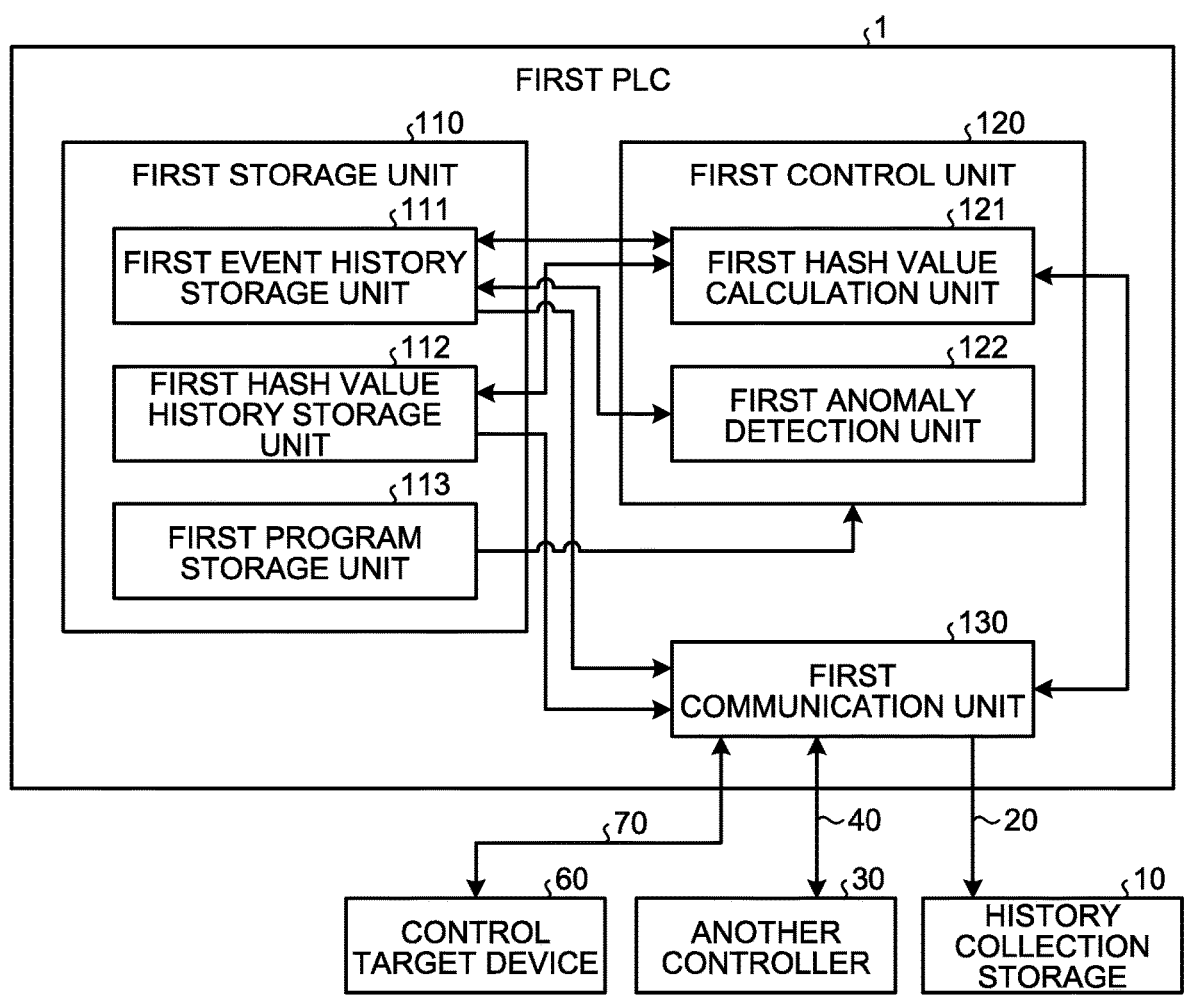
FIG. 1 is a diagram illustrating an example of a functional configuration of a first programmable logic controller that is a controller according to a first embodiment of the present invention.

FIG. 1 is a diagram illustrating an example of a functional configuration of a first programmable logic controller 1 that is a controller according to a first embodiment of the present invention. Hereinafter, the programmable logic controller will be denoted as a PLC. The first PLC 1 is a controller that controls a control target device (that is, a device to be controlled) 60 by executing a program. The control target device 60 is connected to the first PLC 1 via a communication line 70 and can communicate with the first PLC 1. The first PLC 1 has a function of recording event history data, which is information on a history of occurrence of an event occurring in the first PLC 1 during operation, a function of transmitting a hash value of the event history data to another PLC, and a function of storing a hash value transmitted from another PLC. Hereinafter, the functions of the first PLC 1 will be described in detail.

The first PLC 1 includes a first storage unit 110 that records event history data of an event occurring during the operation of the first PLC 1 and various pieces of information; a first control unit 120 that controls an operation related to creation and storage of the event history data for the event occurring in the first PLC 1 and a hash value, and controls an operation of the entire first PLC 1; and a first communication unit 130 that performs communication with another device disposed outside the first PLC 1. These components are connected to one another such that they can communicate information with one another.

The first storage unit 110 includes a first event history storage unit 111 that stores the event history data, a first hash value history storage unit 112 that stores the hash value, and a first program storage unit 113 that stores a control program for controlling the control target device 60 and a control program for controlling the overall processing in the first PLC 1.

The event that occurs in the first PLC 1 is predetermined processing in the first PLC 1 typified by reception processing of a notification of various pieces of information provided to the first PLC 1 in operation or transmission processing of various pieces of information from the first PLC 1 in operation. The event that occurs in the first PLC 1 is exemplified by reception processing, which is performed in a first hash value calculation unit 121 described later, of a notification of various pieces of information that is provided from the control target device 60 or a device outside the first PLC 1 to the first PLC 1 in operation. Here, the various pieces of information corresponding to the event includes information on a change in a state of the control target device 60 as well as the hash value, a time notification, and a search request transmitted from a PLC external to the first PLC 1, where the information on a change in a state of the control target device includes information on a change in a sensor value indicating that the sensor value in the control target device 60 has changed, information on a change in an output value indicating that the output value from the control target device 60 has changed, and alarm information caused by input/output that is out of tolerance in the control target device 60.

Event data indicates the content of the event, and is a code associated with the content of data transmission performed from a device disposed outside the first PLC 1 to the first PLC 1. The event data may also include information received from a device other than the first PLC 1.

The event history data is data indicating an event occurrence history created in the first PLC 1 for each event that occurs in the first PLC 1 during operation. The event history data is combined data in which, for each event that occurs in the first PLC 1, the hash value previously created in the first PLC 1 is combined with current event data created on the basis of the event occurring in the first PLC 1 this time.

The first PLC 1 collects information on an event that occurs during the operation of the first PLC 1, and stores the collected data as the event history data. That is, the first PLC 1 stores the event history data including event data of the event that occurs during the operation of the first PLC 1.

The first event history storage unit 111 stores the latest event history data each time an event occurs in the first PLC 1. When storing new event history data in a state where some event history data is already stored, the first event history storage unit 111 deletes the stored event history data. The event history data deleted from the first event history storage unit 111 is stored in a history collection storage 10 provided outside the first PLC 1 such as an event history server for collecting event histories. The history collection storage 10 is connected to the first PLC 1 via a communication line 20 and can communicate with the first PLC 1. Note that the history collection storage 10 may communicate with the first PLC 1 wirelessly. Processing of storing the event history data in the first event history storage unit 111, processing of deleting the event history data, and processing of storing the event history data in the history collection storage 10 are performed by the control of the first hash value calculation unit 121 described later.

Note that the first event history storage unit 111 may store a predetermined number of pieces of event history data set in advance. In this case, when storing new event history data in the state where the predetermined number of pieces of event history data are stored, the first event history storage unit 111 deletes the event history data stored early.

The hash value is a hash value of event history data calculated by the first hash value calculation unit 121 on the basis of the event history data.

The first hash value history storage unit 112 stores a hash value of the latest event history data each time an event occurs in the first PLC 1. When storing a new hash value in a state where some hash value is already stored, the first hash value history storage unit 112 deletes the stored hash value. The hash value deleted from the first hash value history storage unit 112 is stored in the history collection storage 10 provided outside the first PLC 1 such as a hash value history server for collecting hash values. Processing of storing the hash value in the first hash value history storage unit 112, processing of deleting the hash value, and processing of storing the hash value in the history collection storage 10 are performed by the control of the first hash value calculation unit 121 described later.

Note that the first hash value history storage unit 112 may store a predetermined number of hash values set in advance. In this case, when storing a new hash value in the state where the predetermined number of hash values are stored, the first hash value history storage unit 112 deletes the hash value stored early.

The first control unit 120 executes a program stored in the first program storage unit 113 to control the operation related to creation and storage of the event history data and hash value and control the operation of the entire first PLC 1 including control over the control target device 60. The first control unit 120 includes the first hash value calculation unit 121 and a first anomaly detection unit 122.

The first hash value calculation unit 121 creates event data of an event for each event that occurs in the first PLC 1, and further calculates a hash value on the basis of the event data. The first hash value calculation unit 121 receives various pieces of information from outside the first PLC 1 via the first communication unit 130. The first hash value calculation unit 121 also transmits various pieces of information to the outside of the first PLC 1 via the first communication unit 130.

The first anomaly detection unit 122 recalculates the hash value of the event history data when transmitting the event history data stored in the first event history storage unit 111 to the history collection storage 10 such as the event history server, and detects an anomaly in the recalculated hash value.

The first anomaly detection unit 122 reads the event history data stored in the first event history storage unit 111, and recalculates the hash value of the event history data being read. If the hash value stored in the first hash value history storage unit 112 has been falsified, the hash value stored in the first hash value history storage unit 112 and the recalculated hash value are different values. Also, if the event history data stored in the first event history storage unit 111 has been falsified, the hash value stored in the first hash value history storage unit 112 and the recalculated hash value are different values. Therefore, the first anomaly detection unit 122 can detect an anomaly in the recalculated hash value by comparing the recalculated hash value with the hash value stored in the first hash value history storage unit 112 corresponding to the event history data for which the hash value has been recalculated.

That is, if the hash value stored in the first hash value history storage unit 112 is different from the recalculated hash value, the first anomaly detection unit 122 determines that the recalculated hash value is abnormal and that the hash value stored in the first hash value history storage unit 112 or the event history data stored in the first event history storage unit 111 has been falsified. If the hash value stored in the first hash value history storage unit 112 is the same as the recalculated hash value, the first anomaly detection unit 122 determines that the recalculated hash value is normal and that the event data corresponding to the hash value stored in the first hash value history storage unit 112 and the event history data stored in the first event history storage unit 111 are correct data that is recorded in event recording processing of the first PLC 1.

The first anomaly detection unit 122 discards the event history data stored in the first event history storage unit 111 when detecting an anomaly in the recalculated hash value. Therefore, the event history data for which the anomaly in the recalculated hash value has been detected is discarded without being transmitted from the first hash value history storage unit 112 to the external history collection storage 10. Note that the first anomaly detection unit 122 can perform the recalculation not just when the event history data is transmitted to the history collection storage 10 but at a given timing.

The first communication unit 130 communicates with other devices disposed outside the first PLC 1 including the history collection storage 10 and another controller 30. The first communication unit 130 transmits a hash value in association with an event to the other controller 30 under the control of the first hash value calculation unit 121. Here, the other controller 30 is a device for storing the hash value of the event history data of the event that has occurred in the first PLC 1 and sharing information with the first PLC 1, and is another controller disposed outside the first PLC 1. The other controller 30 is connected to the first PLC 1 via a communication line 40 and can communicate with the first communication unit 130. Note that the other controller 30 may communicate with the first communication unit 130 wirelessly.

The first communication unit 130 receives various pieces of information to be an event from the other device disposed outside the first PLC 1, and transmits the information to the first hash value calculation unit 121. An example of the various pieces of information to be an event includes a hash value for event history data of an event that has occurred in another PLC. Another example of the various pieces of information to be an event includes information transmitted from the control target device 60 such as information on a change in a sensor value of the control target device 60, information on a change in an output value from the control target device 60, and alarm information caused by input/output that is out of tolerance in the control target device 60. Means of communication between the other device and the first communication unit 130 is not particularly limited.

Figure 2:
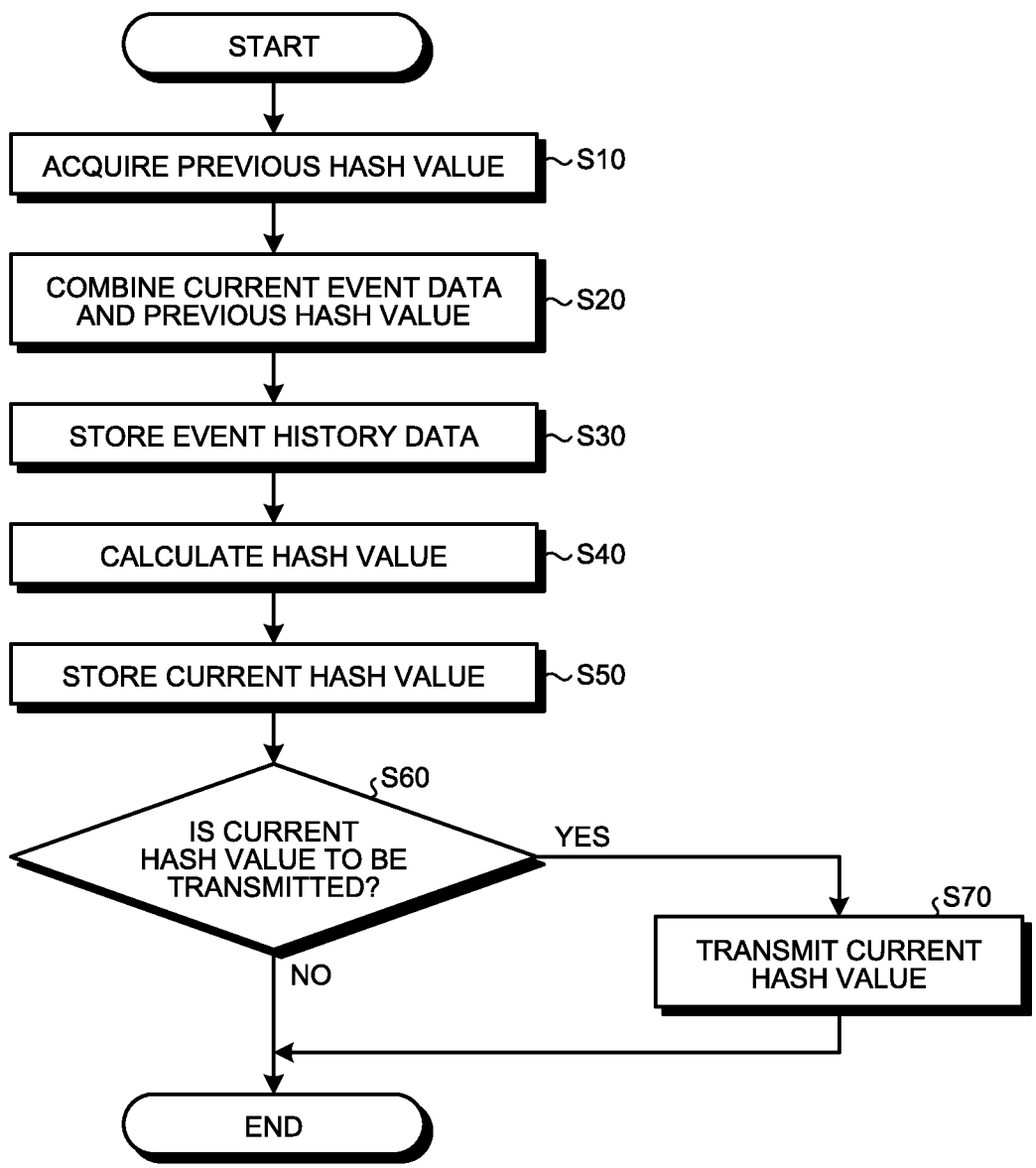
FIG. 2 is a flowchart illustrating a procedure of event recording processing in the first PLC according to the first embodiment of the present invention.
Figure 3:
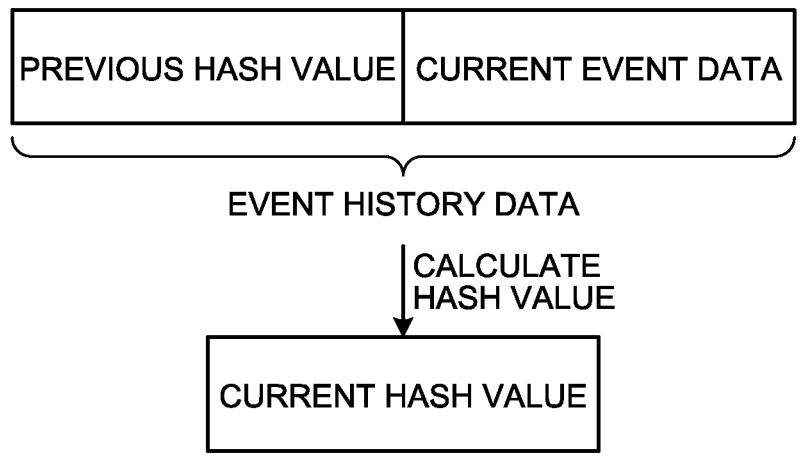
FIG. 3 is a diagram illustrating a method of creating event history data in the first PLC according to the first embodiment of the present invention.

Next, basic event recording processing in the first PLC 1 according to the first embodiment will be described. FIG. 2 is a flowchart illustrating a procedure of the event recording processing in the first PLC 1 according to the first embodiment of the present invention. FIG. 3 is a diagram illustrating a method of creating event history data in the first PLC 1 according to the first embodiment of the present invention.

The event recording processing is started when an event occurs in the first PLC 1 after the first PLC 1 is activated. First, in step S10 of the event recording processing, the first hash value calculation unit 121 acquires a "previous hash value" that is the latest hash value stored in the first hash value history storage unit 112. Note that a "hash value of event history data of a previous event" is simply replaced by the "previous hash value".

Next, in step S20, the first hash value calculation unit 121 combines current event data and the previous hash value as illustrated in FIG. 3 to create event history data as illustrated in FIG. 3. Here, if the current event data has been created at the start of step S20, the first hash value calculation unit 121 creates the event history data using the current event data that has been created. If the current event data has not yet been created at the start of step S20, the first hash value calculation unit 121 creates the current event data on the basis of the event that has occurred in the first PLC 1 this time. The first hash value calculation unit 121 then creates the event history data using the event data created.

Next, in step S30, the first event history storage unit 111 stores the event history data. That is, the first hash value calculation unit 121 causes the first event history storage unit 111 to store the event history data created. Moreover, the current time held by the first PLC 1 may be attached to the event history data and recorded in an event history.

Next, in step S40, the first hash value calculation unit 121 calculates a hash value of the combined data obtained by combining the current event data and the previous hash value as illustrated in FIG. 3, that is, a hash value of the event history data. Then, the hash value calculated in step S40 serves as a current hash value. Note that a "hash value of the event history data of the current event" is simply replaced by the "current hash value".

Next, in step S50, the first hash value history storage unit 112 stores the current hash value. That is, the first hash value calculation unit 121 causes the first hash value history storage unit 112 to store the current hash value calculated.

Next, in step S60, the first hash value calculation unit 121 determines whether or not to transmit the current hash value calculated to another PLC at a predetermined transmission destination. Whether or not to transmit the current hash value is determined on the basis of a determination condition such as how often the calculated hash value is transmitted to another device. The determination condition is determined in advance and stored in the first hash value calculation unit 121. Note that the determination condition may be stored in a component other than the first hash value calculation unit 121 in the first PLC 1.

If it is determined that the current hash value is not to be transmitted, that is, if No in step S60, the series of event recording processing is ended.

If it is determined that the current hash value is to be transmitted, that is, if Yes in step S60, the first hash value calculation unit 121 proceeds to step S70 and transmits the hash value of the current event to another PLC at the predetermined transmission destination, whereby the series of event recording processing is ended. The event recording processing in the first PLC 1 is executed by performing the above processing. Note that the number of other PLCs to which the hash value of the current event is transmitted is not limited. Then, the other PLC to which the hash value is transmitted in step S70 receives and stores the hash value.

Then, after the event recording processing, the first anomaly detection unit 122 of the first PLC 1 reads the event history data stored in the first event history storage unit 111 and recalculates the hash value of the event history data being read. The first anomaly detection unit 122 then detects an anomaly in the recalculated hash value by comparing the recalculated hash value with the hash value stored in the first hash value history storage unit 112 corresponding to the event history data for which the hash value has been recalculated.

As described above, the first PLC 1 has the function in which the first hash value calculation unit 121 transmits the hash value of the event history data of the event that has occurred in the first PLC 1 to the other PLC. As a result, the hash values corresponding to one event that has occurred in the first PLC 1 are stored in a plurality of devices including the first PLC 1 and the other PLC. Thus, a verification device provided separately from the first PLC 1 and the other PLC compares the two hash values stored in the first PLC 1 and the other PLC to be able to verify whether or not the hash value stored in the first PLC 1 is the correct hash value recorded in the event recording processing of the first PLC 1. That is, the first PLC 1 can detect falsification of the hash value stored in the first PLC 1 when the hash values corresponding to one event stored in the first PLC 1 and the other PLC are different values. Therefore, the first PLC 1 can easily detect falsification of the hash value of the event stored in the first PLC 1 by comparing the hash value of the event of the first PLC 1 stored in the first PLC 1 with the hash value stored in the other PLC.

Moreover, as described above, the first anomaly detection unit 122 can determine whether the recalculated hash value is normal or abnormal, thereby being able to verify whether or not the hash value stored in the first hash value history storage unit 112 and the event history data stored in the first event history storage unit 111 are correct data.

Figure 4:
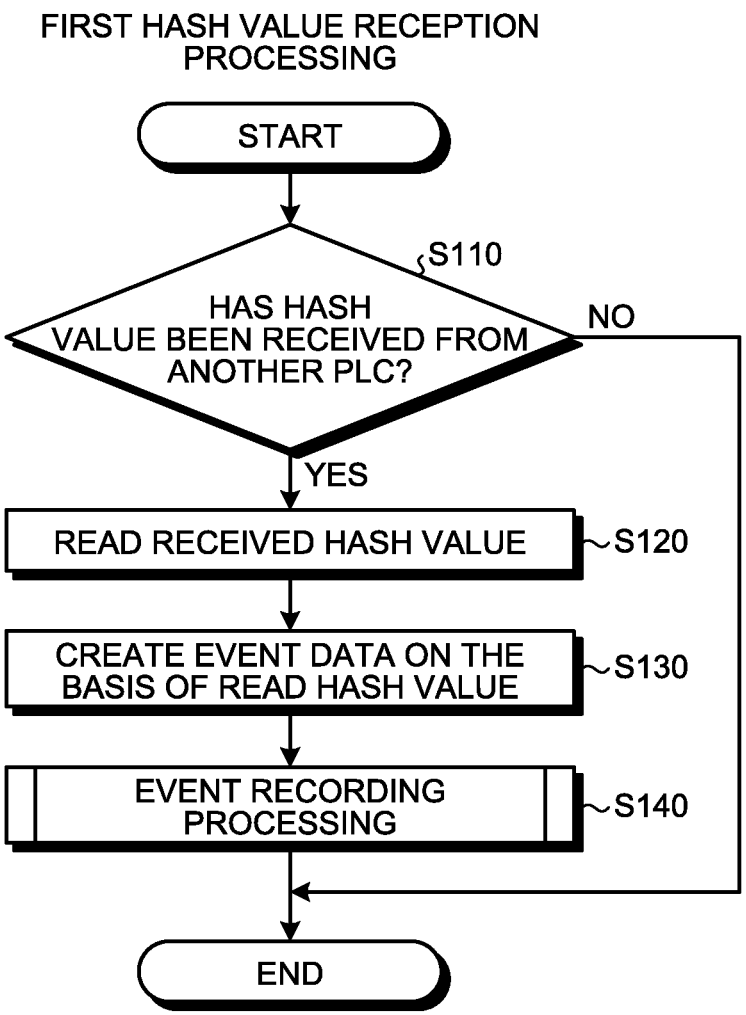
FIG. 4 is a flowchart illustrating a procedure of first hash value reception processing in the first PLC according to the first embodiment of the present invention.

Next, the event recording processing performed in the first PLC 1 when the first PLC 1 receives a hash value from another PLC will be described. The other PLC has the same function as the first PLC 1. FIG. 4 is a flowchart illustrating a procedure of first hash value reception processing in the first PLC 1 according to the first embodiment of the present invention.

The first hash value reception processing is started at a predetermined timing after the first PLC 1 is activated. First, in step S110, the first hash value calculation unit 121 determines whether or not a hash value has been received from another PLC. The first communication unit 130 transmits communication information including a hash value to the first hash value calculation unit 121 when having received the communication information including the hash value from another PLC. Thus, the first hash value calculation unit 121 can determine whether or not a hash value has been received from another PLC depending on whether or not the communication information including the hash value has been received from the first communication unit 130.

If it is determined that a hash value has not been received from another PLC, that is, if No in step S110, the series of event recording processing is ended.

If it is determined that a hash value has been received from another PLC, that is, if Yes in step S110, the first hash value calculation unit 121 proceeds to step S120 and reads the received hash value from the communication information including the hash value.

Next, in step S130, the first hash value calculation unit 121 creates event data including the read hash value on the basis of the read hash value. Then, the event data created in step S130 serves as event data whose event is the reception of the hash value of the other PLC.

Next, in step S140, the first hash value calculation unit 121 performs the event recording processing illustrated in FIG. 2. By performing the above processing, the event recording processing when the first PLC 1 receives the hash value from the other PLC is executed. The first hash value reception processing may be executed at regular intervals or executed each time the first PLC 1 saves event history data, and can be executed at a given timing and a given frequency set in the first PLC 1.

As described above, the first PLC 1 has the function in which the first hash value calculation unit 121 transmits the hash value of the event history data of the event that has occurred in the first PLC 1 to the other PLC and also the function in which the first hash value calculation unit 121 causes the first event history storage unit 111 to store the hash value transmitted from the other PLC while including it in the event history data. The first PLC 1 then performs the first hash value reception processing described above to be able to receive the hash value of the event history data of the event in the other PLC and store it in the first PLC 1.

As a result, the hash values corresponding to the event that has occurred in the first PLC 1 are stored in a plurality of devices including the first PLC 1 and the other PLC. The first PLC 1 uses a verification device provided separately from both the first PLC 1 and the other PLC to compare the two hash values corresponding to one event stored in the first PLC 1 and the other PLC, thereby being able to verify whether or not the hash value stored in the first PLC 1 is the correct hash value recorded in the event recording processing of the first PLC 1. That is, the first PLC 1 can detect falsification of the hash value stored in the first PLC 1 when the hash values corresponding to one event stored in the first PLC 1 and the other PLC are different values.

Moreover, the hash values corresponding to one event that has occurred in another PLC are stored in a plurality of devices including the first PLC 1 and the other PLC. In this case as well, a verification device compares the two hash values corresponding to one event stored in the first PLC 1 and the other PLC, thereby being able to verify whether or not the hash value stored in the other PLC is the correct hash value recorded in the event recording processing of the other PLC. That is, the other PLC can detect falsification of the hash value stored in the other PLC when the hash values corresponding to one event stored in the first PLC 1 and the other PLC are different values. Therefore, even when the hash value of the event stored in the other PLC is falsified, the other PLC can easily detect falsification of the hash value of the event stored in the other PLC by comparing the hash value of the event stored in the other PLC with the hash value of the event of the other PLC stored in the first PLC 1.

The processing illustrated in each of FIGS. 2 and 4 is executed by one first PLC 1. A configuration in which two PLCs each having the function of the first PLC 1 are combined corresponds to a configuration of a minimum PLC system in which the PLCs can store each other's hash values. The following illustrates a data flow when the hash value in each PLC is stored in such a configuration of the PLC system.

Figure 5:
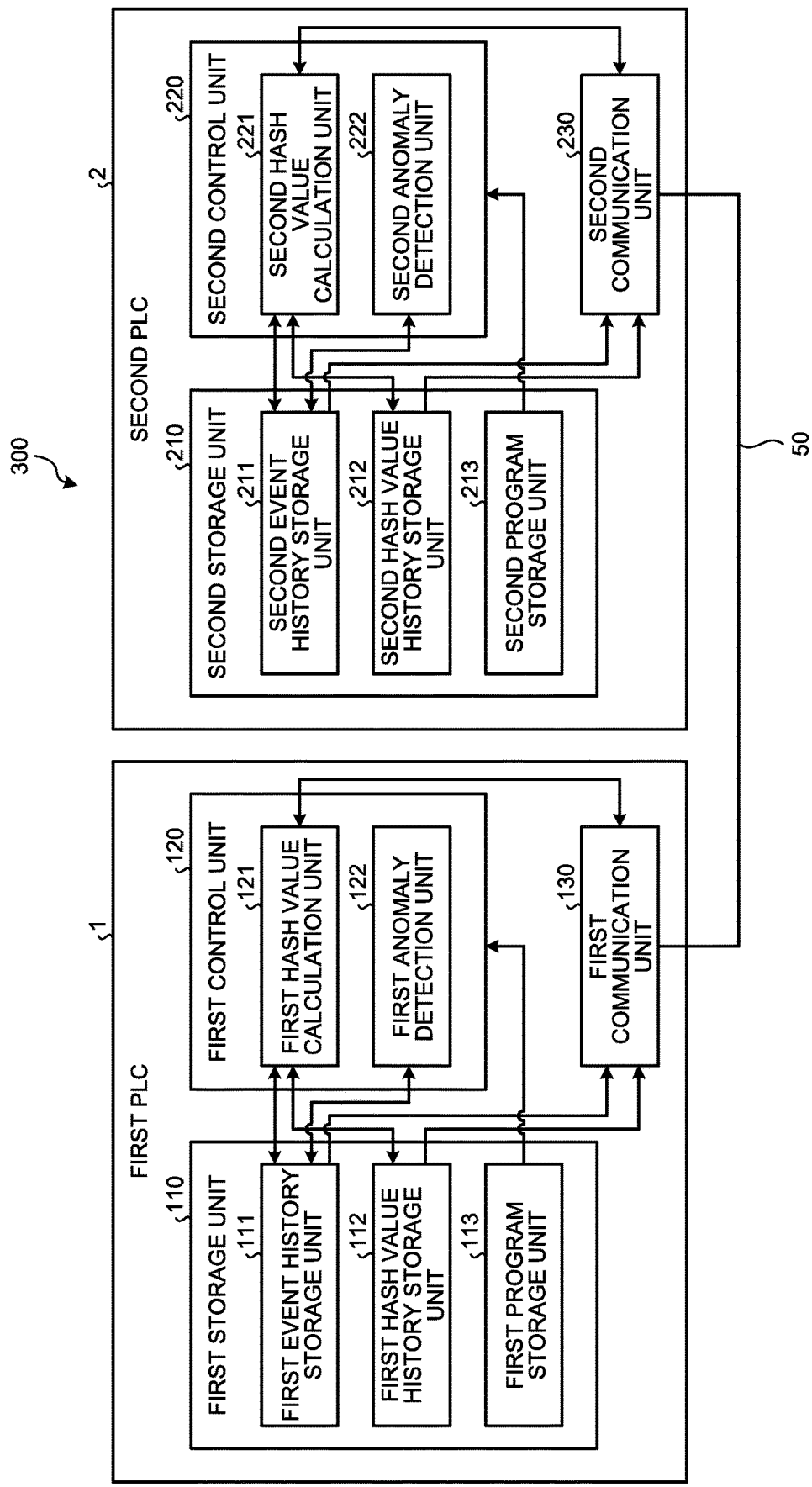
FIG. 5 is a diagram illustrating an example of a configuration of a PLC system that is a controller system according to the first embodiment of the present invention.

FIG. 5 is a diagram illustrating an example of a configuration of a PLC system 300 that is a controller system according to the first embodiment of the present invention. The PLC system 300 illustrated in FIG. 5 is a minimum PLC system in which the first PLC 1 and a second PLC 2 can communicate with each other via a network 50 and can store each other's hash values. In this case, one of the first PLC 1 and the second PLC 2 has a function as the other controller 30 disposed outside the other PLC.

The second PLC 2 has a configuration and a function similar to those of the first PLC 1. That is, the second PLC 2 includes a second storage unit 210, a second control unit 220, and a second communication unit 230. These components are connected to one another such that they can communicate information with one another. The second storage unit 210 corresponds to the first storage unit 110, the second control unit 220 corresponds to the first control unit 120, and the second communication unit 230 corresponds to the first communication unit 130.

The second storage unit 210 includes a second event history storage unit 211, a second hash value history storage unit 212, and a second program storage unit 213. The second event history storage unit 211 corresponds to the first event history storage unit 111, the second hash value history storage unit 212 corresponds to the first hash value history storage unit 112, and the second program storage unit 213 corresponds to the first program storage unit 113.

The second control unit 220 includes a second hash value calculation unit 221 and a second anomaly detection unit 222. The second hash value calculation unit 221 corresponds to the first hash value calculation unit 121, and the second anomaly detection unit 222 corresponds to the first anomaly detection unit 122.

The first PLC 1 and the second PLC 2 transmit a hash value of an event history of the latest event that has occurred in each PLC to each other by cyclic communication. The PLC having received the hash value of the latest event history stores the received hash value as event history data, and calculates and stores a hash value of the event history data. The first PLC 1 creates event data on the basis of the hash value received from the second PLC 2, and further creates event history data from the event data and a previous hash value in the first PLC 1 and stores the created event history data. The second PLC 2 creates event data on the basis of the hash value received from the first PLC 1, and further creates event history data from the event data and a previous hash value in the second PLC 2 and stores the created event history data. That is, the first PLC 1 and the second PLC 2 mutually transmit and receive the hash values of the event histories so that the event history stored in each PLC includes the hash value of the event history of the other PLC, whereby a hash chain of the event history data of both the first PLC 1 and the second PLC 2 is formed.

Note that the PLCs can store each other's hash values in the PLC system 300 but need not necessarily exchange the hash values with each other, where it is possible to adopt a configuration in which the hash value of one PLC is transmitted to the other PLC and stored therein.

Figure 6:
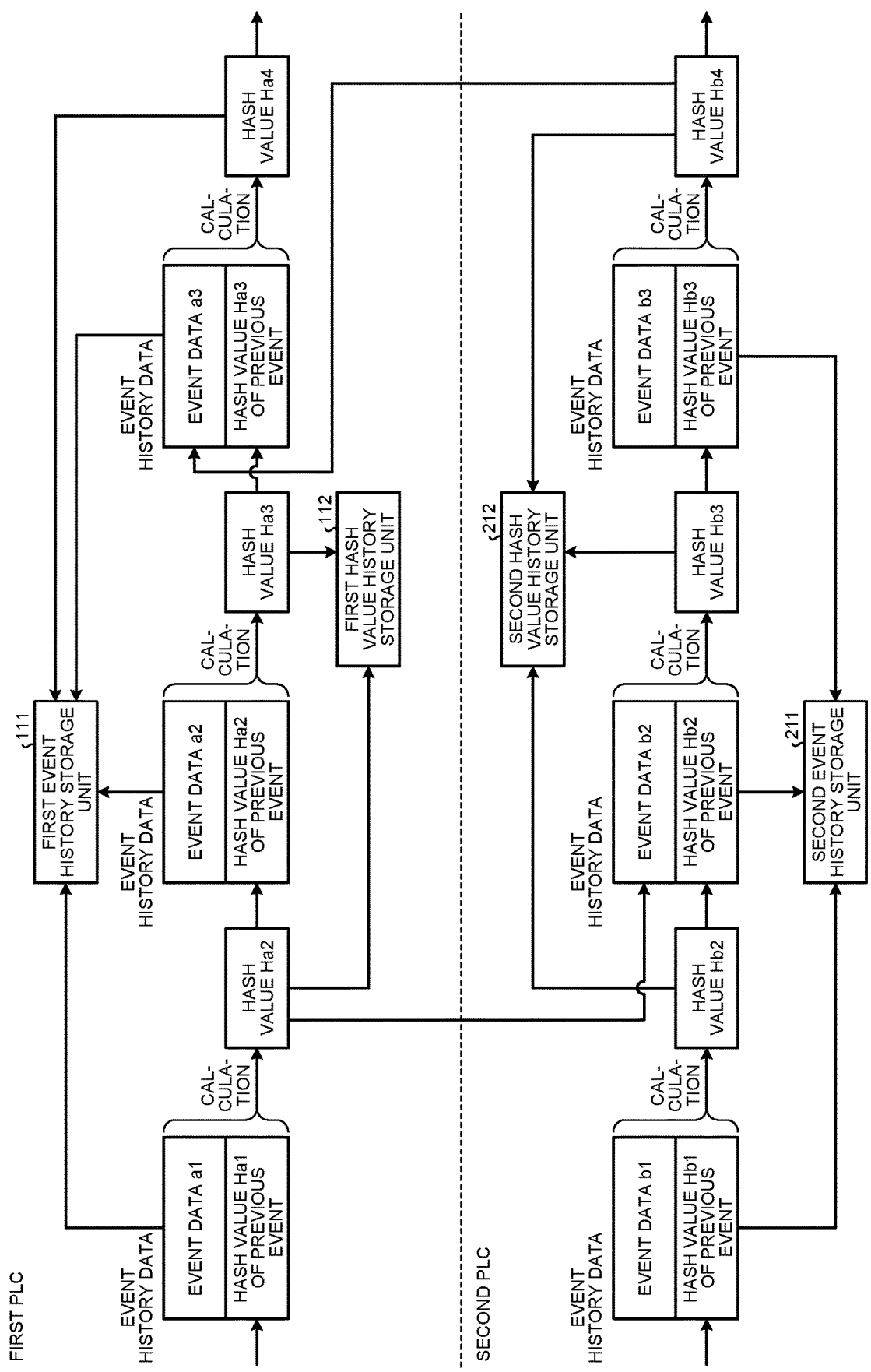
FIG. 6 is a diagram illustrating an example of a data flow when the event history data is stored in the PLC system according to the first embodiment of the present invention.

FIG. 6 is a diagram illustrating an example of a data flow when the event history data is stored in the PLC system 300 according to the first embodiment of the present invention. Note that in the following, the first PLC 1 and the second PLC 2 may simply be referred to as PLCs when not distinguished from each other.

FIG. 6 illustrates the example where, in the first PLC 1, the first hash value calculation unit 121 creates event history data including event data a1, which is event data of an event that has occurred in the first PLC 1, and a hash value Ha1 of a previous event, and then calculates a hash value Ha2 of the event history data created. The first hash value calculation unit 121 causes the first event history storage unit 111 to store the event history data created, and causes the first hash value history storage unit 112 to store the hash value Ha2 created. The first hash value calculation unit 121 also transmits the hash value Ha2 created to the second PLC 2.

Next, the first hash value calculation unit 121 creates event history data including event data a2, which is event data of an event that has occurred in the first PLC 1, and the hash value Ha2 of the previous event, and then calculates a hash value Ha3 of the event history data created. The first hash value calculation unit 121 causes the first event history storage unit 111 to store the event history data created, and causes the first hash value history storage unit 112 to store the hash value Ha3 created.

Next, the first hash value calculation unit 121 creates event history data including event data a3, which is event data corresponding to a hash value Hb4 transmitted from the second PLC 2, and the hash value Ha3 of the previous event, and then calculates a hash value Ha4 of the event history data created. Here, the event data a3 includes the hash value Hb4 transmitted from the second PLC 2.

Meanwhile, FIG. 6 illustrates the example where, in the second PLC 2, the second hash value calculation unit 221 creates event history data including event data b1, which is event data of an event that has occurred in the second PLC 2, and a hash value Hb1 of a previous event, and then calculates a hash value Hb2 of the event history data created. The second hash value calculation unit 221 causes the second event history storage unit 211 to store the event history data created, and causes the second hash value history storage unit 212 to store the hash value Hb2 created.

Next, the second hash value calculation unit 221 creates event history data including event data b2, which is event data corresponding to the hash value Ha2 transmitted from the first PLC 1, and the hash value Hb2 of the previous event, and then calculates a hash value Hb3 of the event history data created. The second hash value calculation unit 221 causes the second event history storage unit 211 to store the event history data created, and causes the second hash value history storage unit 212 to store the hash value Hb3 created. Here, the event data b2 includes the hash value Ha2 transmitted from the first PLC 1.

Next, the second hash value calculation unit 221 creates event history data including event data b3, which is event data of an event that has occurred in the second PLC 2, and the hash value Hb3 of the previous event, and then calculates the hash value Hb4 of the event history data created. The second hash value calculation unit 221 causes the second event history storage unit 211 to store the event history data created, and causes the second hash value history storage unit 212 to store the hash value Hb4 created. The second hash value calculation unit 221 also transmits the hash value Hb4 created to the first PLC 1.

The timing for transmitting the hash value of the event history in the first PLC 1 and the second PLC 2 is not particularly limited. The hash value may be transmitted every time the event history data is recorded in each PLC as described above, or transmitted intermittently when a predetermined number of the stored hash values of the event histories are accumulated. However, in terms of transmitting a correct hash value of the event history stored in each PLC and storing it in the other PLC, it is preferable to transmit the hash value every time the event history data is recorded in each PLC.

Moreover, the receiving PLC that receives the transmitted hash value need not receive and store the transmitted hash value every time, but need only receive and store the hash value according to the use condition of the receiving PLC. The receiving PLC that receives the transmitted hash value may miss and fail to store the hash value in some cases. That is, the operation on the receiving side may be uncertain, and the storage processing need only be performed as far as the receiving side can receive the hash value. As a result, in a wireless communication network that is battery driven or the like, power consumption can be reduced by reducing the frequency of transmission/reception processing.

As described above, in the PLC system 300, the two PLCs that are the first PLC 1 and the second PLC 2 mutually perform the processing illustrated in FIG. 6. As a result, the two PLCs store each other's hash values of PLCs by sending the hash values to each other, so that the hash value of the event history data of a single event that has occurred in one PLC is stored in the two PLCs. Therefore, the PLC system 300 can easily detect falsification of the hash value by comparing the hash values stored in the two PLCs even when the hash value of the event stored in one of the two PLCs is falsified. It is also possible to configure a PLC system in which three or more PLCs each having the same function as the first PLC 1 are communicatively connected to one another. The PLCs each store a hash value calculated by the hash value calculation unit and a hash value of at least one PLC of the plurality of other PLCs in the PLC system. That is, the PLCs can each store the hash value of the other PLC by sending the hash values to one another.

Note that although the PLC is used as the other controller 30 for storing the hash value of one event in another device and sharing the information in the PLC system 300, the other controller 30 can be implemented using a current time management server for managing the current time or an event history storage server for storing event data. In the case where the current time management server is used for the other controller 30, a hash value of event history data of an event that has occurred in the PLC is stored in the PLC and the current time management server. In the case where the event history storage server is used for the other controller 30, a hash value of event history data of an event that has occurred in the PLC is stored in the PLC and the event history storage server.

Moreover, a hash value that need to be received cannot be received in some situations when it is assumed that the network 50 in the PLC system 300 is implemented using an uncertain network in which loss of transmitted data, garbling of transmit data, and missing of received data occur at a certain frequency. For such an uncertain network, the transmitting PLC may transmit actual data of event history data and a current hash value to the receiving PLC when transmitting the hash value. That is, the transmitting PLC may transmit a hash value of a previous event, current event data, and the hash value of the current event. As a result, the hash value associated with the event is transmitted to the receiving PLC which is the other controller 30.

The receiving PLC stores the actual data of the event history data together with the hash value. In this case, the receiving PLC can verify that the actual data of the event history data and the hash value received are correct by recalculating the hash value using the actual data of the event history data in the first anomaly detection unit 122 or the second anomaly detection unit 222 that is an anomaly detection unit. If it is determined as a result of the recalculation that the actual data of the event history data and the hash value are not correct and a corruption of these data has been detected, the received data is discarded. The timing at which the receiving PLC performs the above recalculation is not limited, and may be the timing when the hash value and the actual data of the event history data are received or may be another timing.

Moreover, the transmitting PLC from which the hash value is transmitted may store the fact that the hash value is transmitted to the uncertain network in the first event history storage unit 111 or the second event history storage unit 211 that is an event history storage unit. When event history data indicating that the hash value is transmitted is created and stored in the event history storage unit, the event history data is verified upon being read from the transmitting PLC transmitting the hash value and the receiving PLC receiving the hash value, whereby it can be detected that there is a difference between the hash value saved in the transmitting PLC and the hash value that should actually be received by the transmitting PLC. Note that even if the receiving PLC misses the hash value received, the hash value that has been read can be verified, and the rate of missing the hash value can be calculated from the history of the hash values transmitted by the transmitting PLC. As a result, the uncertainty of the network and the reliability of the hash value received and stored can be quantitatively calculated from these pieces of information.

Figure 7:
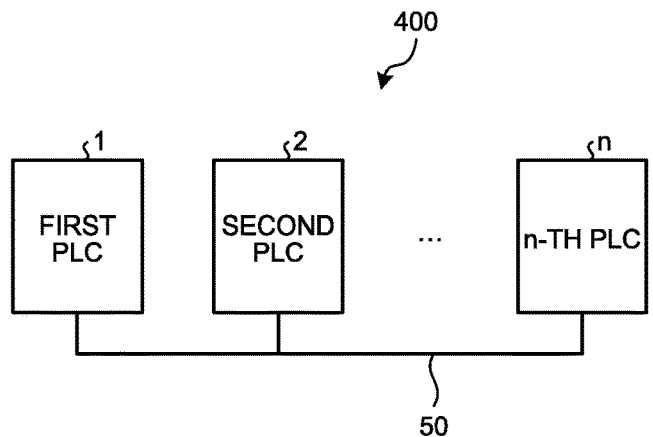
FIG. 7 is a diagram illustrating a configuration of a PLC system according to the first embodiment of the present invention.

Next, a description will be given of a case where a hash value transmitted from another PLC is stored in a limited manner rather than being stored unconditionally without restrictions. FIG. 7 is a diagram illustrating a configuration of a PLC system 400 according to the first embodiment of the present invention. The PLC system 400 is a PLC system in which a large number of PLCs each having the same function as the first PLC 1 are connected via the network 50, and a hash value of event history data of an event that has occurred in one PLC can be stored in a plurality of the other PLCs. Hereinafter, there will be described second hash value reception processing including reception enable/disable determination processing that determines whether or not a hash value transmitted from another PLC can be received in the PLC system 400. The PLC system 400 is configured such that n PLCs including the first PLC 1 and the second PLC 2 and having the same function as the first PLC 1 can communicate with one another. Note that although processing in the first PLC 1 will be described below, the PLC included in the PLC system 400 has the same function as the first PLC 1 and thus the following processing can be performed in all the PLCs included in the PLC system 400.

Figure 8:
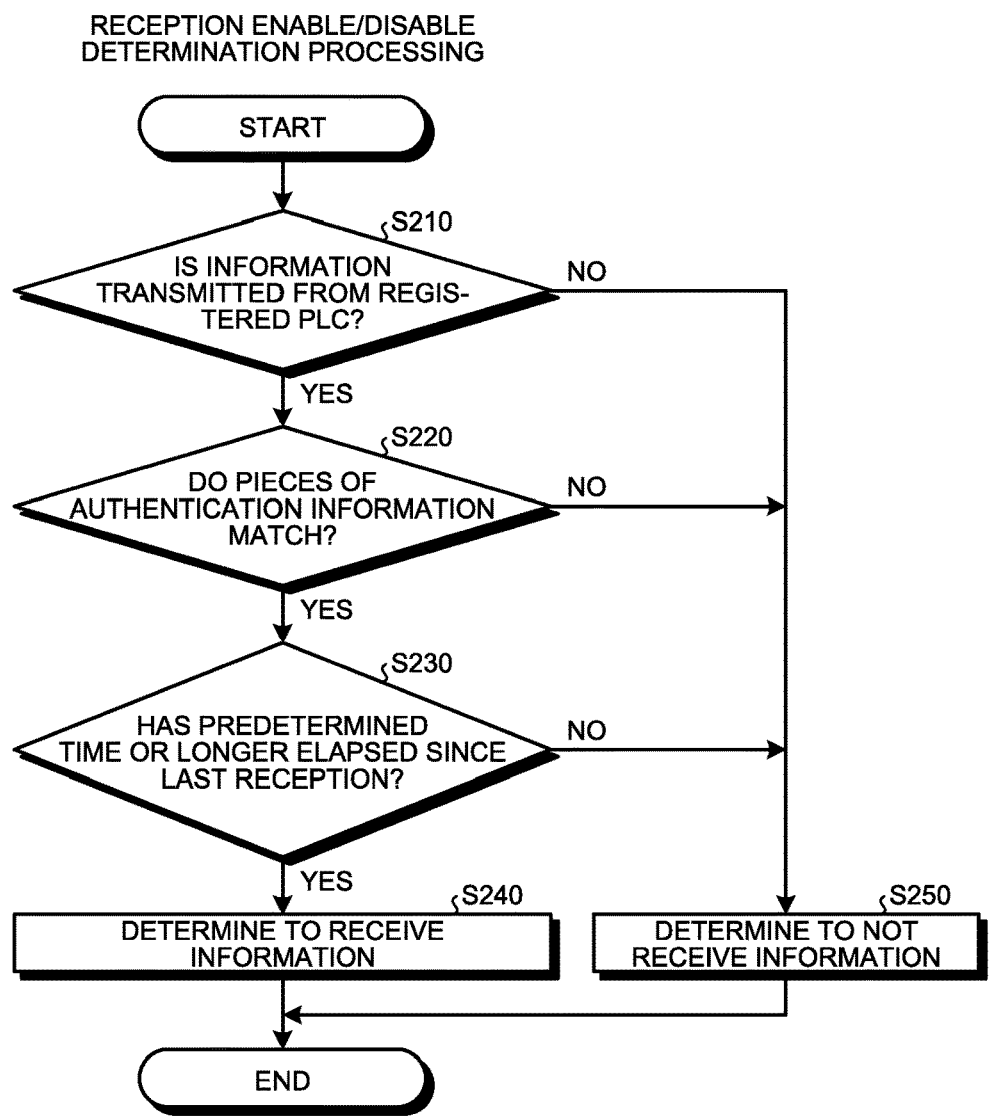
FIG. 8 is a flowchart illustrating a procedure of reception enable/disable determination processing in the first PLC according to the first embodiment of the present invention.

First, there will be described the reception enable/disable determination processing that determines whether or not the first PLC 1 can receive a hash value transmitted from another PLC. FIG. 8 is a flowchart illustrating a procedure of the reception enable/disable determination processing in the first PLC 1 according to the first embodiment of the present invention.

After the first PLC 1 is activated, the reception enable/disable determination processing is started when communication information including a hash value is transmitted from another PLC in the PLC system 400 to the first communication unit 130. First, in step S210, the first communication unit 130 of the first PLC 1 determines whether or not the communication information including the hash value, which is transmitted from the other PLC in the PLC system 400, is communication information transmitted from a registered PLC for the hash value that is a registered controller for the hash value. The registered PLC for the hash value is a PLC registered as a PLC whose hash value is allowed to be received in the first PLC 1 among the other PLCs in the PLC system 400 when the communication information including the hash value is transmitted from the other PLC in the PLC system 400. Information on the registered PLC for the hash value is exemplified by information such as an Internet Protocol (IP) address or a port number of the source PLC, and is determined in advance and registered in the first communication unit 130. Note that the information on the PLC whose hash value is allowed to be received may be stored in a component other than the first communication unit 130 in the first PLC 1.

If the communication information including the hash value transmitted from the other PLC is not the communication information transmitted from the registered PLC, that is, if No in step S210, the first communication unit 130 proceeds to step S250 and determines not to receive the communication information including the hash value.

In contrast, if the communication information including the hash value transmitted from the other PLC is the communication information transmitted from the registered PLC, that is, if Yes in step S210, the first communication unit 130 proceeds to step S220. In step S220, the first communication unit 130 determines whether or not authentication information included in the communication information including the hash value, which is transmitted from the other PLC, matches authentication information attached to the PLC that is the controller whose hash value is allowed to be received. The authentication information attached to the PLC whose hash value is allowed to be received is determined in advance and registered in the first communication unit 130. Note that the information on the PLC whose hash value is allowed to be received may be stored in a component other than the first communication unit 130 in the first PLC 1.

If the authentication information included in the communication information including the hash value, which is transmitted from the other PLC, does not match the authentication information attached to the PLC whose hash value is allowed to be received, that is, if No in step S220, the first communication unit 130 proceeds to step S250 and determines not to receive the communication information including the hash value.

In contrast, if the authentication information included in the communication information including the hash value, which is transmitted from the other PLC, matches the authentication information attached to the PLC whose hash value is allowed to be received, that is, if Yes in step S220, the first communication unit 130 proceeds to step S230. In step S230, the first communication unit 130 determines whether or not a predetermined time or longer has elapsed since the last reception of the communication information including the hash value from the registered PLC. The predetermined time is an elapsed time after the communication information including the hash value is received from the registered PLC last time, and is determined in advance for the registered PLC and registered in the first communication unit 130. Note that the information on the predetermined time may be stored in a component other than the first communication unit 130 in the first PLC 1.

If the predetermined time or longer has not elapsed, that is, if No in step S230, the first communication unit 130 proceeds to step S250 and determines not to receive the communication information including the hash value.

In contrast, if the predetermined time or longer has elapsed, that is, if Yes in step S230, the first communication unit 130 proceeds to step S240 and determines to receive the communication information including the hash value.

Figure 9:
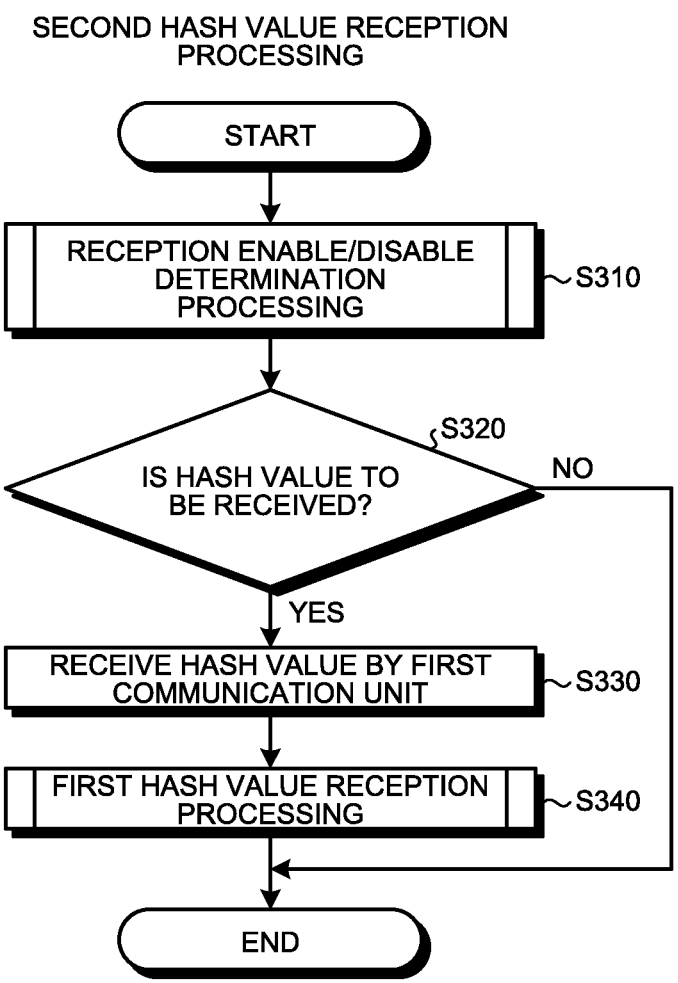
FIG. 9 is a flowchart illustrating a procedure of second hash value reception processing including the reception enable/disable determination processing in the first PLC according to the first embodiment of the present invention.

Next, second hash value reception processing including the above reception enable/disable determination processing will be described. FIG. 9 is a flowchart illustrating a procedure of the second hash value reception processing including the reception enable/disable determination processing in the first PLC 1 according to the first embodiment of the present invention.

After the first PLC 1 is activated, the second hash value reception processing is started when communication information including a hash value is transmitted from another PLC in the PLC system 400 to the first communication unit 130. First, in step S310, the first communication unit 130 performs the reception enable/disable determination processing illustrated in FIG. 8.

Next, in step S320, the first communication unit 130 determines whether or not to receive the hash value transmitted from the other PLC on the basis of a result of determination made in the reception enable/disable determination processing.

If it is determined not to receive the hash value transmitted from the other PLC on the basis of the result of determination made in the reception enable/disable determination processing, that is, if No in step S320, the series of second hash value reception processing is ended.

In contrast, if it is determined to receive the hash value transmitted from the other PLC on the basis of the result of determination made in the reception enable/disable determination processing, that is, if Yes in step S320, the first communication unit 130 proceeds to step S330 and receives the hash value transmitted from the other PLC.

Next, in step S340, the first hash value calculation unit 121 performs the first hash value reception processing illustrated in FIG. 4, and then the series of second hash value reception processing is ended.

The above reception enable/disable determination processing determines whether or not to receive the communication information including the hash value, which is transmitted from the other PLC, by using the registered PLC, the authentication information, and the elapsed time after reception as determination conditions for enabling/disabling reception. That is, the reception enable/disable determination processing performed by the first PLC 1 is a hash value filtering function based on mutual authentication between the first PLC 1 and the other PLC that transmits the communication information including the hash value.

Thus, the first PLC 1 performs the second hash value reception processing including the reception enable/disable determination processing to be able to store event history data whose event is the reception of the hash value only when a predetermined condition is satisfied. As a result, the first PLC 1 is effective as a countermeasure for reducing damage caused by a failure such as a Denial of Service (DoS) attack, data falsification caused by impersonation, simple slowdown, and missing data. Moreover, when hash values are transmitted/received among a large number of PLCs in the PLC system 400, the hash value reception processing performed by one PLC increases, so that missing of a hash value possibly increases during reception. The first PLC 1 can select a hash value by using the second hash value reception processing described above, thereby being able to reduce missed reception of a hash value.

Note that although the registered PLC, the authentication information, and the elapsed time after reception are used as the determination conditions for enabling/disabling reception in the above description, the determination conditions for enabling/disabling reception are not limited to these. Therefore, the reception enable/disable determination processing is not limited to the processing described above.

A command with which the first PLC 1 transmits a hash value may be implemented by a command combined with another command rather than being independent. In particular, a method that uses a command of another function for transmitting a hash value includes a method that transmits a hash value while including the hash value in communication executed periodically such as communication used for a time notification function for providing notification of the current time or communication used for a search function for searching for another PLC.

First, there will be described a case where the communication used for the time notification function for providing notification of the current time is used for transmission of a hash value. That is, there will be described hash value reception processing when the first PLC 1 in the PLC system 400 executes transmission of a hash value in combination with the time notification function of the first PLC 1.

Here, the first PLC 1 has the time notification function for notifying another PLC of current time information that is counted by a clock function of the first control unit 120. Thus, in step S70 of FIG. 2, the first PLC 1 can transmit a hash value of an event in the first PLC 1 to another PLC while including the hash value in a time notification that notifies the other PLC in the PLC system 400 of the current time information. The same applies to the PLC other than the first PLC 1 in the PLC system 400.

Figure 10:
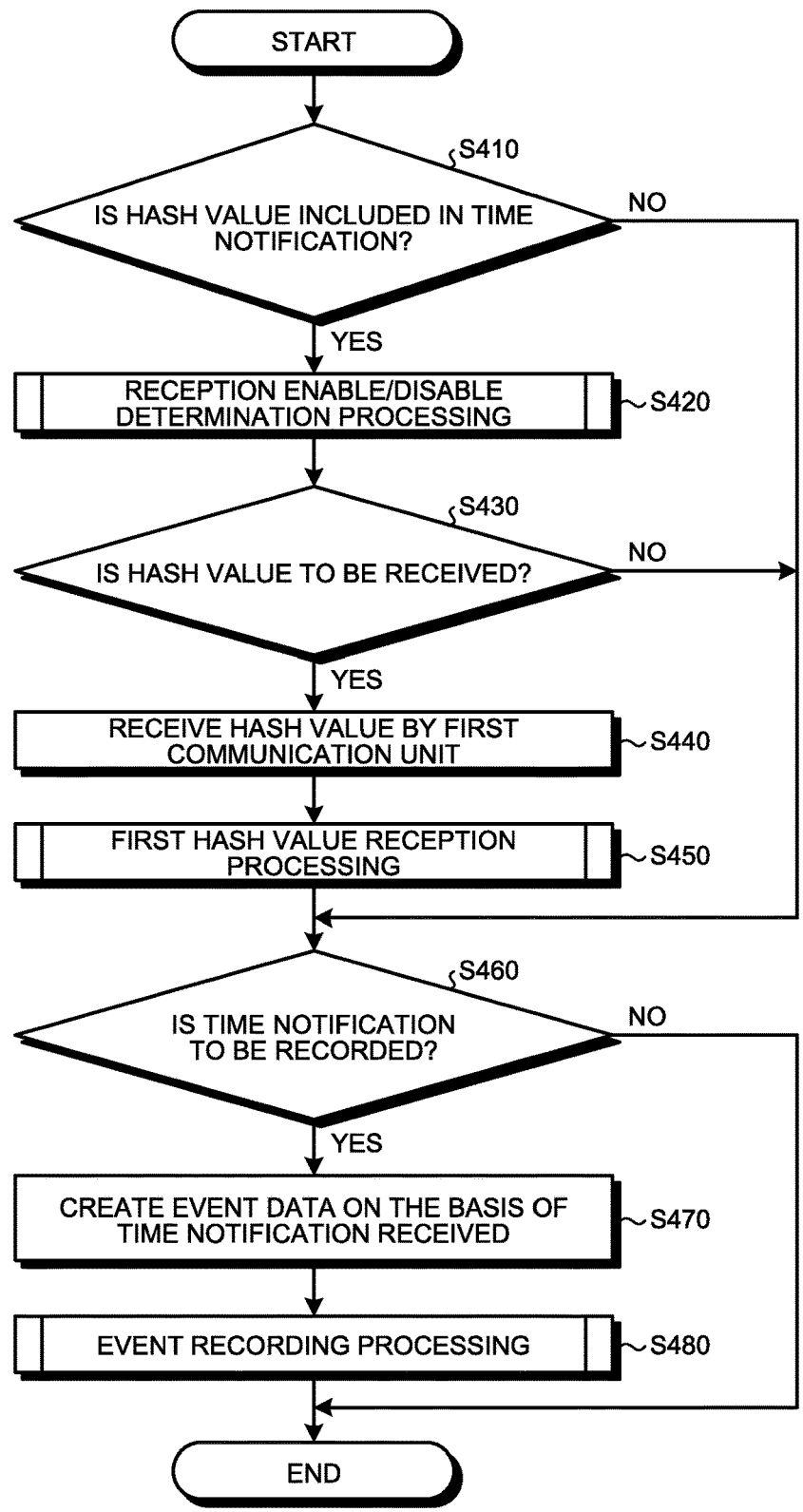
FIG. 10 is a flowchart illustrating a procedure of third hash value reception processing that combines a time notification function and transmission of a hash value in the first PLC according to the first embodiment of the present invention.

FIG. 10 is a flowchart illustrating a procedure of third hash value reception processing that combines the time notification function and transmission of a hash value in the first PLC 1 according to the first embodiment of the present invention. After the first PLC 1 is activated, the third hash value reception processing is started when a time notification is transmitted from another PLC in the PLC system 400 to the first communication unit 130. First, in step S410, the first communication unit 130 determines whether or not a hash value is included in the time notification transmitted from the other PLC in the PLC system 400.

If the time notification includes a hash value, that is, if Yes in step S410, the first communication unit 130 proceeds to step S420 and performs the reception enable/disable determination processing illustrated in FIG. 8 for the hash value.

Next, in step S430, the first communication unit 130 determines whether or not to receive the hash value on the basis of a result of determination made in the reception enable/disable determination processing.

If it is determined to receive the hash value on the basis of the result of determination made in the reception enable/disable determination processing, that is, if Yes in step S430, the first communication unit 130 proceeds to step S440 and receives the hash value together with the time notification. Then, the first communication unit 130 transmits the hash value and the time notification to the first hash value calculation unit 121.

Next, in step S450, the first hash value calculation unit 121 performs the first hash value reception processing illustrated in FIG. 4.

Next, in step S460, the first hash value calculation unit 121 determines whether or not to record the time notification. The first hash value calculation unit 121 determines whether or not to record the time notification on the basis of a determination criterion that is determined in advance and stored in the first hash value calculation unit 121.

If it is determined to record the time notification, that is, if Yes in step S460, the first hash value calculation unit 121 proceeds to step S470 and creates event data on the basis of the time notification received. That is, the first hash value calculation unit 121 creates event data whose event is the reception of the time notification.

Next, in step S480, the first hash value calculation unit 121 performs the event recording processing illustrated in FIG. 2, and the series of third hash value reception processing is ended.

Returning to step S410, if a hash value is not included in the time notification, that is, if No in step S410, the first communication unit 130 receives the time notification, transmits it to the first hash value calculation unit 121, and proceeds to step S460.

Returning to step S430, if it is determined not to receive the hash value on the basis of the result of determination made in the reception enable/disable determination processing, that is, if No in step S430, the first communication unit 130 does not receive the hash value but receives only the time notification and transmits it to the first hash value calculation unit 121, thereby proceeding to step S460.

Returning to step S460, if it is determined not to record the time notification, that is, if No in step S460, the series of third hash value reception processing is ended.

The first PLC 1 performs the third hash value reception processing illustrated in FIG. 10 to be able to store the hash value included in the time notification and transmitted from the other PLC. Then, by referring to the event history stored on the basis of the time notification, the first PLC 1 can determine that the hash value appearing in a given PLC in the PLC system 400 has started to be recorded in another PLC by comparing the event histories stored on the basis of the time notification in addition to the hash chain. Note that the above processing is an example of the processing when reception of the time notification and reception of the hash value are combined into one, but the processing when reception of the time notification and reception of the hash value are combined into one is not limited to the above procedure.

Next, there will be described a case where the communication used for the search function for searching for another PLC is used for transmission of a hash value. When the communication used for the search function of a PLC is used for transmission of a hash value, the operation of receiving a hash value in the first PLC 1 includes processing similar to that when the time notification function of the PLC is used as described above. In this case, however, a search request is transmitted in the absence of information on a destination PLC to which the search request is transmitted, so that broadcast transmission needs to be performed. Moreover, the receiving PLC that receives the search request needs to return a response to the search request.

Figure 11:
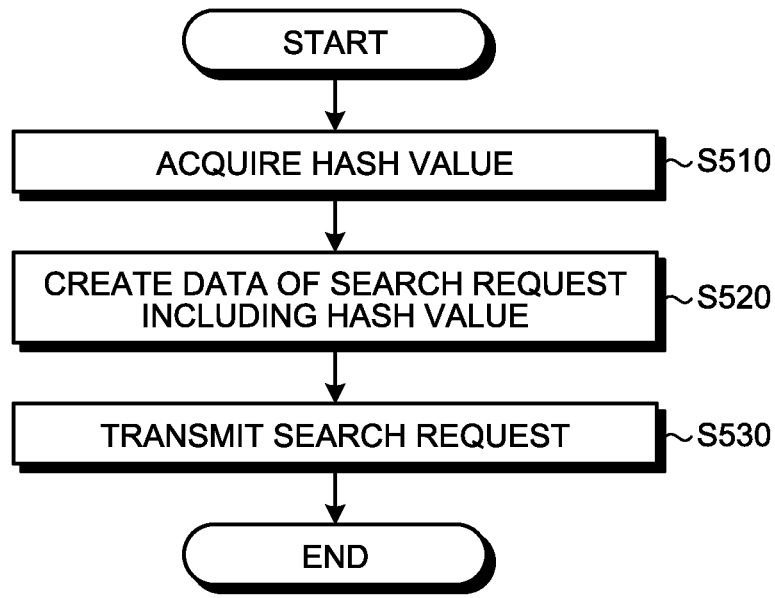
FIG. 11 is a flowchart illustrating a procedure of transmission processing of a search request including a hash value in the first PLC according to the first embodiment of the present invention.

First, transmission processing of a search request will be described. FIG. 11 is a flowchart illustrating a procedure of the transmission processing of a search request including a hash value in the first PLC 1 according to the first embodiment of the present invention. The transmission processing of a search request including a hash value is started at a predetermined timing after the first PLC 1 is activated. First, in step S510, the first hash value calculation unit 121 acquires a hash value stored in the first hash value history storage unit 112.

Next, in step S520, the first hash value calculation unit 121 creates data of a search request including the hash value.

Next, in step S530, the first hash value calculation unit 121 broadcasts the search request including the hash value to all the PLCs in the PLC system 400.

Figure 12:
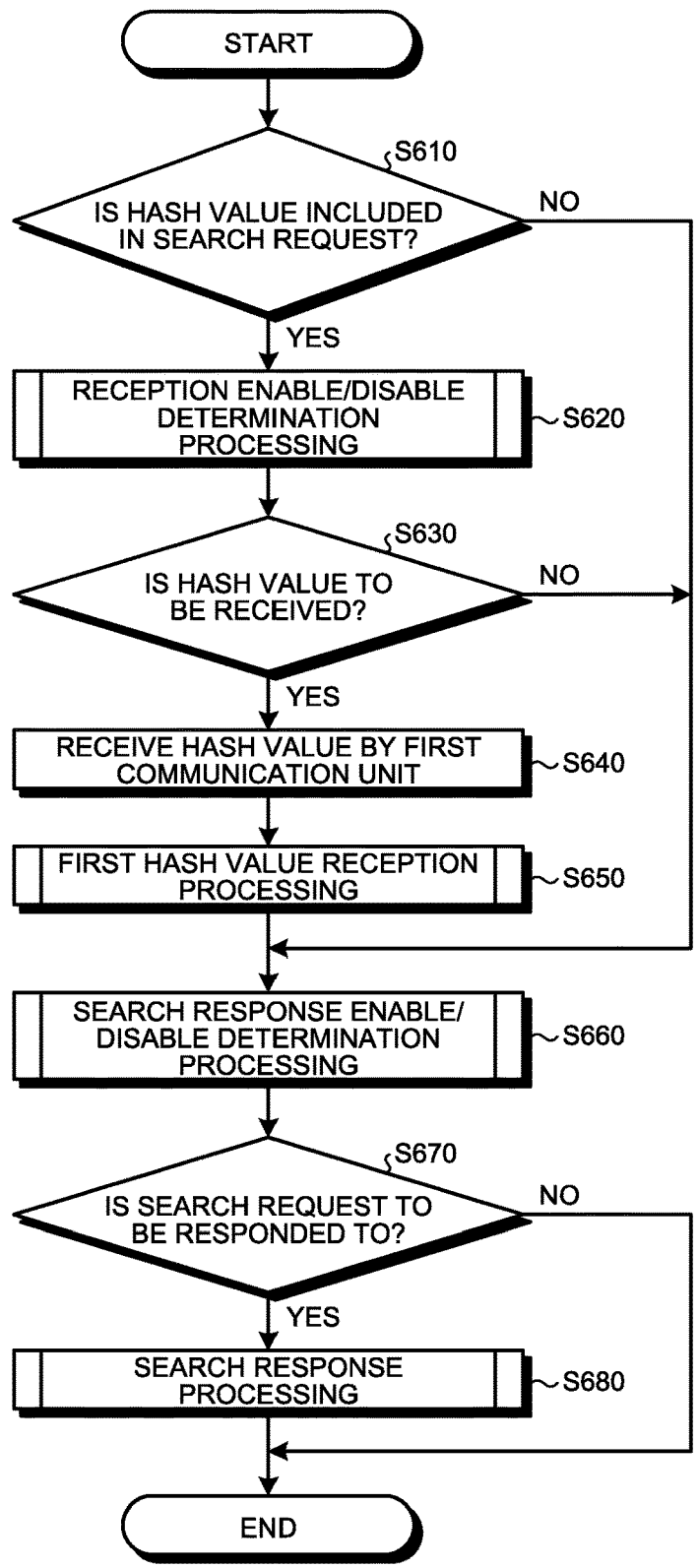
FIG. 12 is a flowchart illustrating a procedure of reception processing of a search request including a hash value in the first PLC according to the first embodiment of the present invention.

Next, there will be described a case where the first PLC 1 performs search request reception processing for receiving the search request including the hash value that is broadcast by the processing illustrated in the flowchart of FIG. 11. FIG. 12 is a flowchart illustrating a procedure of the reception processing of the search request including the hash value in the first PLC 1 according to the first embodiment of the present invention. After the first PLC 1 is activated, the reception processing of the search request including the hash value is started when the search request is transmitted from another PLC in the PLC system 400 to the first communication unit 130. First, in step S610, the first communication unit 130 determines whether or not the hash value is included in the search request transmitted from the other PLC in the PLC system 400.

If the search request includes the hash value, that is, if Yes in step S610, the first communication unit 130 proceeds to step S620 and performs the reception enable/disable determination processing illustrated in FIG. 8 for the hash value.

Next, in step S630, the first communication unit 130 determines whether or not to receive the hash value on the basis of a result of determination made in the reception enable/disable determination processing.

If it is determined to receive the hash value on the basis of the result of determination made in the reception enable/disable determination processing, that is, if Yes in step S630, the first communication unit 130 proceeds to step S640 and receives the hash value together with the search request. Then, the first communication unit 130 transmits the hash value and the search request to the first hash value calculation unit 121.

Next, in step S650, the first hash value calculation unit 121 performs the first hash value reception processing illustrated in FIG. 4.

Next, in step S660, the first hash value calculation unit 121 performs search response enable/disable determination processing for determining whether or not a response to the search request can be made. The search response enable/disable determination processing will be described later.

Next, in step S670, the first hash value calculation unit 121 determines whether or not to respond to the search request on the basis of a result of determination made in the search response enable/disable determination processing. The first hash value calculation unit 121 determines whether or not to respond to the search request on the basis of a determination criterion that is determined in advance and stored in the first hash value calculation unit 121.

If it is determined to respond to the search request on the basis of the result of determination made in the search response enable/disable determination processing, that is, if Yes in step S670, the first hash value calculation unit 121 proceeds to step S680 and performs search response processing for responding to the search request, and the series of search request reception processing is ended.

Returning to step S610, if the hash value is not included in the search request, that is, if No in step S610, the first communication unit 130 receives the search request, transmits it to the first hash value calculation unit 121, and proceeds to step S660.

Returning to step S630, if it is determined not to receive the hash value on the basis of the result of determination made in the reception enable/disable determination processing, that is, if No in step S630, the first communication unit 130 does not receive the hash value but receives only the search request and transmits it to the first hash value calculation unit 121, thereby proceeding to step S660.

Returning to step S670, if it is determined not to respond to the search request, that is, if No in step S670, the series of search request reception processing is ended.

Figure 13:
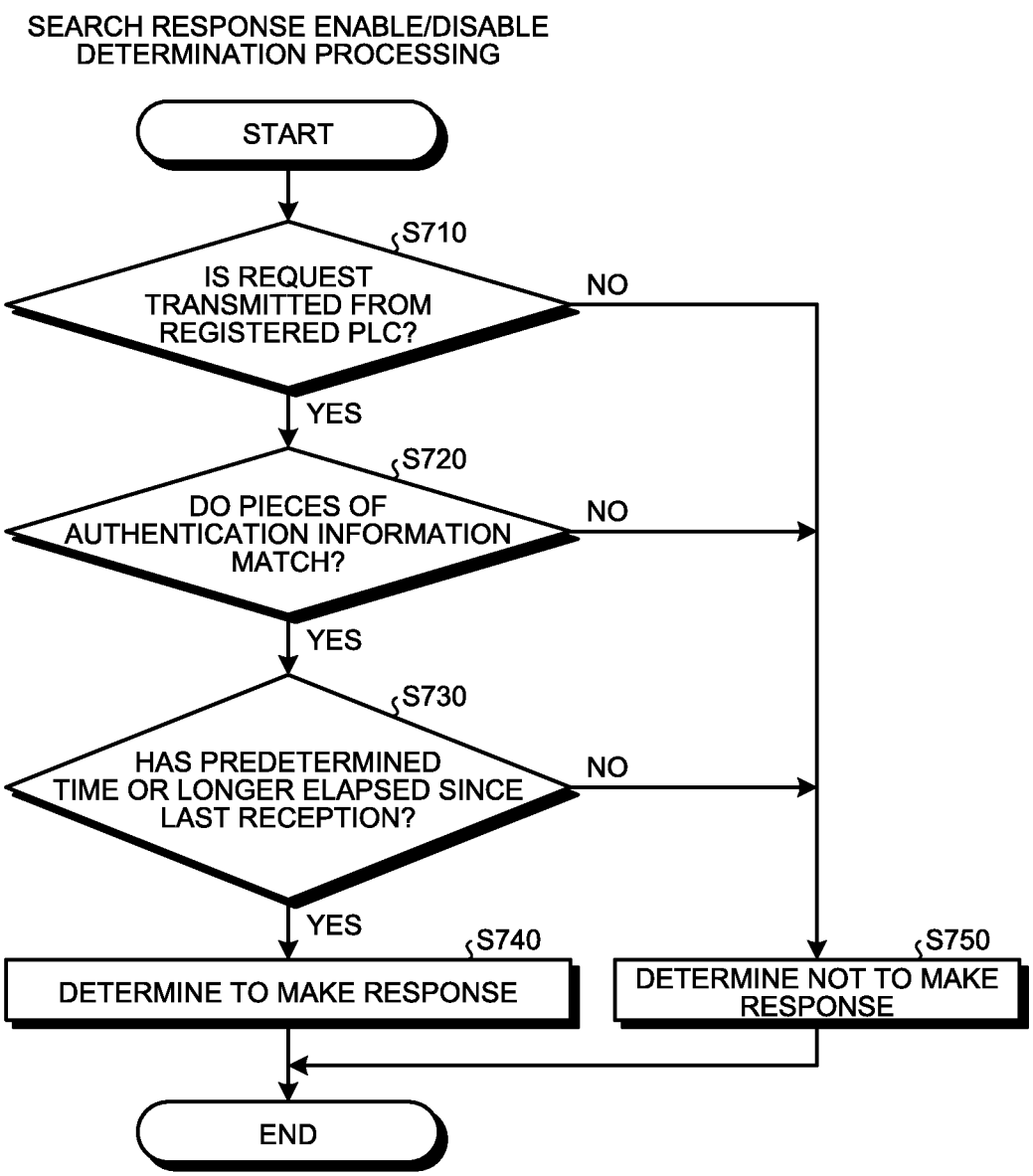
FIG. 13 is a flowchart illustrating a procedure of search response enable/disable determination processing in the first PLC according to the first embodiment of the present invention.

Next, there will be described a case where the first PLC 1 performs the search response enable/disable determination processing. FIG. 13 is a flowchart illustrating a procedure of the search response enable/disable determination processing in the first PLC 1 according to the first embodiment of the present invention.

First, in step S710, the first hash value calculation unit 121 of the first PLC 1 determines whether or not the search request transmitted from the other PLC in the PLC system 400 is a search request transmitted from a registered PLC related to a response to the search request, the registered PLC being a registered controller related to a response to the search request. The registered PLC related to a response to the search request is a PLC registered as a PLC whose search request can be responded to when the search request is transmitted from the other PLC in the PLC system 400. Information on the registered PLC related to a response to the search request is determined in advance and registered in the first communication unit 130. Note that the information on the registered PLC may be stored in a component other than the first communication unit 130 in the first PLC 1.

If the search request is not the search request transmitted from the registered PLC, that is, if No in step S710, the first hash value calculation unit 121 proceeds to step S750 and determines not to respond to the search request.

In contrast, if the search request is the search request transmitted from the registered PLC, that is, if Yes in step S710, the first hash value calculation unit 121 proceeds to step S720. In step S720, the first hash value calculation unit 121 determines whether or not authentication information included in the search request matches authentication information attached to the registered PLC. The authentication information attached to the registered PLC is determined in advance and registered in the first hash value calculation unit 121. Note that the authentication information attached to the registered PLC may be stored in a component other than the first hash value calculation unit 121 in the first PLC 1.

If the authentication information included in the search request does not match the authentication information attached to the registered PLC, that is, if No in step S720, the first hash value calculation unit 121 proceeds to step S750 and determines not to respond to the search request.

In contrast, if the authentication information included in the search request matches the authentication information attached to the registered PLC, that is, if Yes in step S720, the first hash value calculation unit 121 proceeds to step S730. In step S730, the first hash value calculation unit 121 determines whether or not a predetermined time or longer has elapsed since the last reception of the search request from the registered PLC having transmitted the search request. The predetermined time is an elapsed time after the search request transmitted from the registered PLC is received last time, and is determined in advance for the registered PLC and registered in the first hash value calculation unit 121. Note that the information on the predetermined time may be stored in a component other than the first hash value calculation unit 121 in the first PLC 1.

If the predetermined time or longer has not elapsed, that is, if No in step S730, the first hash value calculation unit 121 proceeds to step S750 and determines not to respond to the search request.

In contrast, if the predetermined time or longer has elapsed, that is, if Yes in step S730, the first hash value calculation unit 121 proceeds to step S740 and determines to respond to the search request.

Figure 14:
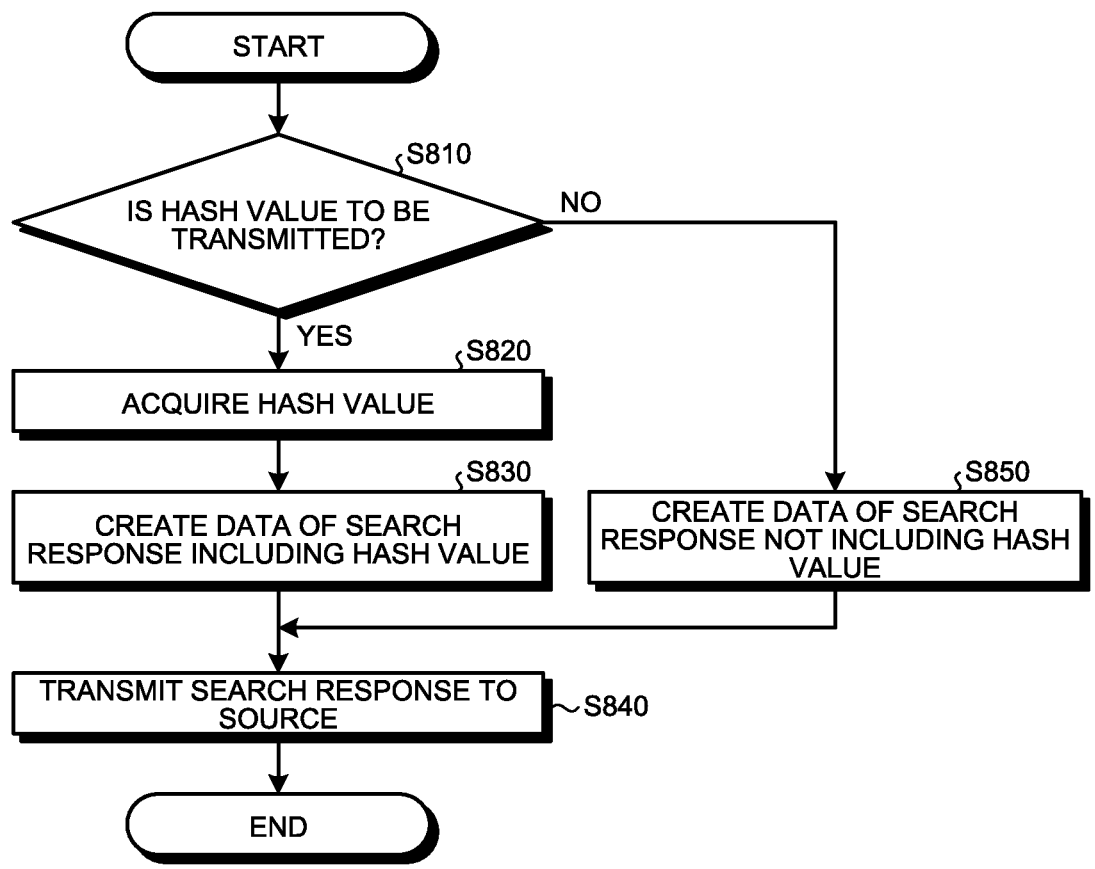
FIG. 14 is a flowchart illustrating a procedure of search response processing in the first PLC according to the first embodiment of the present invention.

Next, there will be described a case where the first PLC 1 performs the search response processing. FIG. 14 is a flowchart illustrating a procedure of the search response processing in the first PLC 1 according to the first embodiment of the present invention.

First, in step S810, the first hash value calculation unit 121 determines whether or not to transmit a hash value to the PLC from which the search request is transmitted. Whether or not to transmit the hash value is determined on the basis of a predetermined determination condition. The determination condition is determined in advance and stored in the first hash value calculation unit 121. Note that the determination condition may be stored in a component other than the first hash value calculation unit 121 in the first PLC 1.

If it is determined to transmit the hash value to the PLC from which the search request is transmitted, that is, if Yes in step S810, the first hash value calculation unit 121 proceeds to step S820 and acquires the hash value stored in the first hash value history storage unit 112.

Next, in step S830, the first hash value calculation unit 121 creates data of a search response including the hash value as a response to the search request.

Next, in step S840, the first hash value calculation unit 121 transmits the search response including the hash value to the PLC from which the search request is transmitted, and the series of search response processing is ended.

Returning to step S810, if it is determined not to transmit the hash value to the PLC from which the search request is transmitted, that is, if No in step S810, the first hash value calculation unit 121 proceeds to step S850 and creates data of a search response not including the hash value as a response to the search request. Then, step S840 is performed, and the series of search response processing is ended.

The first PLC 1 performs the search request reception processing illustrated in FIG. 12 to be able to store the hash value included in the search request and transmitted from the other PLC. The first PLC 1 may also store an event history on the basis of the search request, as in the case of the third hash value reception processing illustrated in FIG. 10. By referring to the event history stored on the basis of the search request, it can be determined that the hash value appearing in a given PLC in the PLC system 400 has started to be recorded in another PLC by comparing the event histories stored on the basis of the search request in addition to the hash chain.

Note that although the hash value reception processing is performed prior to the response to the search request in FIG. 12, the hash value reception processing may be performed only when the search request has been responded to. Note that the above processing is an example of the processing when reception of the search request and reception of the hash value are combined into one, but the processing when reception of the search request and reception of the hash value are combined into one is not limited to the above procedure.

The broadcast communication has a large load on the network and can cause a failure. The communication method may thus be changed when the PLC with which communication is established becomes clear by receiving the search response. Here, each PLC can establish communication adjacency relationship by adopting a method in which a PLC with an empty slot on the receiving side responds to the broadcast and establishes a transmission/reception relationship. Then, a PLC on the transmitting side performs processing of transmitting the hash value to an adjacent PLC in the adjacency relationship, so that the hash value can be transmitted/received without increasing the load on the network. That is, the communication path for data in normal communication and the communication path for the hash value may be configured separately.

Moreover, the above description has illustrated the one-to-one communication and the broadcast as methods of transmitting the hash value, but the transmission may be one-way as a method of transmitting the hash value. Cyclic communication is not a method for reliable reception depending on the network. Such cyclic communication can be configured to keep transmitting the current latest hash value as the data of the PLC on the transmitting side that publishes a status of constantly keeping updating data. Moreover, the hash value may be transmitted in turn to addresses registered in advance or to one or a plurality of addresses detected as a result of a search, where the hash value is expected to be reliably received at the addresses.

Next, there will be described an example of event histories when event histories accumulated in the event history storage units in the first PLC 1, the second PLC 2, a third PLC 3, ..., and an n-th PLC n, which are the plurality of PLCs in the PLC system 400, are collected in one place.

Figure 15:
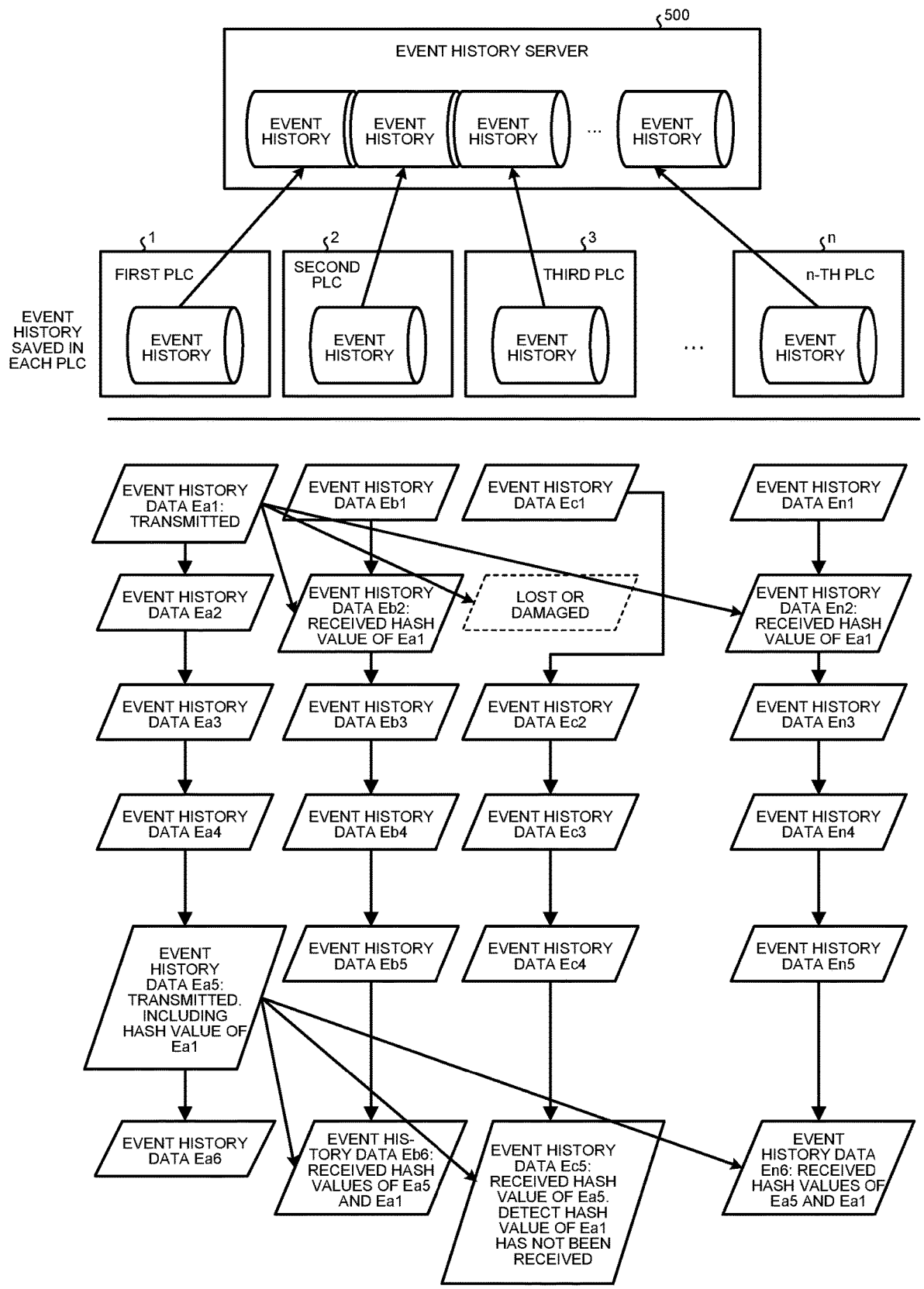
FIG. 15 is a diagram for explaining an example of event histories accumulated in event history storage units of the PLCs and collected in an event history server according to the first embodiment of the present invention.

FIG. 15 is a diagram for explaining an example of event histories accumulated in the event history storage units of the PLCs and collected in an event history server 500 according to the first embodiment of the present invention. The event history server 500 is the history collection storage 10 described above, and is an event history accumulation server that collects and accumulates the event histories accumulated in the event history storage units of the plurality of PLCs in the PLC system 400. FIG. 15 illustrates the details of the events stored in each PLC below each PLC in the figure. Here, the figure illustrates a case where six event histories can be stored in each PLC.

The event history storage unit of the first PLC 1 stores event history data Ea1, event history data Ea2, event history data Ea3, event history data Ea4, event history data Ea5, and event history data Ea6, and these pieces of event history data are copied and transmitted to the event history server 500.

The event history storage unit of the second PLC 2 stores event history data Eb1, event history data Eb2, event history data Eb3, event history data Eb4, event history data Eby, and event history data Eb6, and these pieces of event history data are copied and transmitted to the event history server 500.

The event history storage unit of the third PLC 3 stores event history data Ec1, event history data Ec2, event history data Ec3, event history data Ec4, and event history data Ec5, and these pieces of event history data are copied and transmitted to the event history server 500.

The event history storage unit of the n-th PLC n stores event history data En1, event history data En2, event history data En3, event history data En4, event history data En5, and event history data En6, and these pieces of event history data are copied and transmitted to the event history server 500.

In FIG. 15, a solid line connecting the pieces of event history data indicates that the pieces of event history data are connected by a hash chain. Also in FIG. 15, an arrow connecting the pieces of event history data indicates that the hash value of the event history data is transmitted to another PLC.

Verification of the event histories collected in the event history server 500 can detect that the first PLC 1 has transmitted the hash value of the event history data Ea1 to the second PLC 2, the third PLC 3, ..., and the n-th PLC n. Each PLC having received the hash value of the event history data Ea1 creates event data, the event of which is the reception of the hash value of the event history data Ea1. As for the third PLC 3, it is assumed that the hash value of the event history data Ea1 is received after the event history data Ec1, as with the second PLC 2 and the n-th PLC n. However, in the third PLC 3, the hash value of the event history data Ea1 is lost or damaged, so that it can be detected that the event data whose event is the reception of the hash value of the event history data Ea1 is not created and stored.

Moreover, verification of the event histories collected in the event history server 500 can detect that the first PLC 1 has transmitted the hash value of the event history data Ea5 to the second PLC 2, the third PLC 3, ..., and the n-th PLC n. It can also be detected that the first PLC 1 has transmitted the hash value of the event history data Ea1 to the second PLC 2, the third PLC 3, ..., and the n-th PLC n together with the hash value of the event history data Ea5. Each PLC having received the hash value of the event history data Ea5 creates event data, the event of which is the reception of the hash values of the event history data Ea5 and the event history data Ea1.

Moreover, verification of the event history data Ec5 in the third PLC 3 can detect that the third PLC 3 has not received the hash value of the event history data Ea1.

Therefore, by collecting the event history data from the plurality of PLCs in the PLC system 400 in the event history server 500 and verifying the data, it is possible to identify which event history data has been lost in the PLC system 400 as a whole. It is also possible to quantitatively detect how much event history data has been lost in the PLC system 400 as a whole and quantitatively calculate the reliability of the PLC system 400 as a whole.

For the event history data in the first PLC 1, the hash values can be recalculated and verified in order starting from the event history data Ea1 to be able to determine that the pieces of event history data stored in the first PLC 1 are stored correctly by the hash chain. The same applies to the second PLC 2, the third PLC 3, ..., and the n-th PLC n. It can thus be determined that the event history data stored in the first PLC 1, the second PLC 2, the third PLC 3, ..., and the n-th PLC n is the correct data stored in each PLC.

In the PLC system 400, as exemplified by the transmission of the hash value of the event history data Ea5 and the hash value of the event history data Ea1 in the first PLC 1, the hash values of the plurality of pieces of event history data can be transmitted at the time of transmission of the hash value of the event history data to another PLC. That is, in the PLC system 400, the hash value of the latest event history data can be transmitted while including therein the hash value of one or a plurality of pieces of event history data transmitted previously. Thus, as described above, the verification of the event history data Ec5 in the third PLC 3 can detect that the third PLC 3 has not received the hash value of the event history data Ea1, and the hash value of the event history data that has not been received can be stored.

Figure 16:
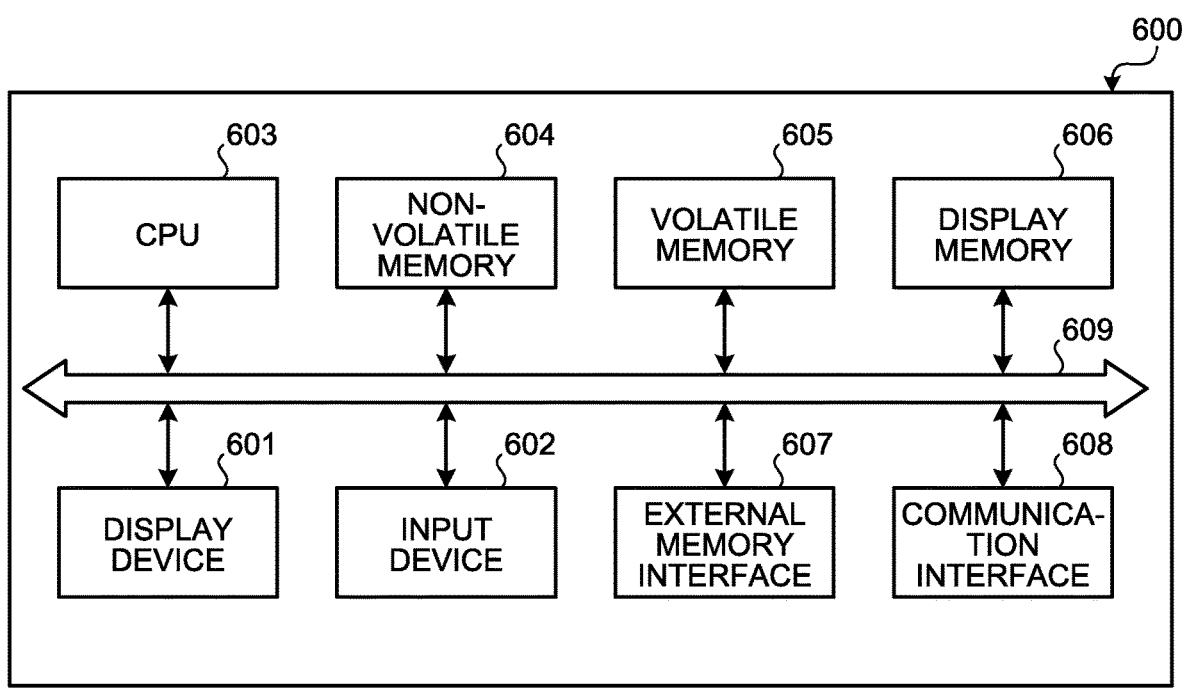
FIG. 16 is a block diagram schematically illustrating an example of a configuration of a computer device that implements a function as the PLC according to the first embodiment.

FIG. 16 is a block diagram schematically illustrating an example of a configuration of a computer device 600 that implements a function as the PLC according to the first embodiment described above. The processing executed in the PLC according to the first embodiment described above can be implemented by configuring the processing as a program that stores the processing procedure and executing the program by a computer device that has a configuration including a CPU and a storage as illustrated in FIG. 16.

As illustrated in FIG. 16, the computer device 600 has a configuration in which a bus 609 connects a display device 601 such as a liquid crystal display (LCD), an input device 602 such as a simple keyboard, a CPU 603 that performs an operation, a non-volatile memory 604 such as a read only memory (ROM), a volatile memory 605 such as a random access memory (RAM), a display memory 606 that stores a display screen to be displayed on the display device 601, an external memory interface 607 that is an interface with a removable external memory such as a flash memory, a communication interface 608 that communicates with an external device, and the like. Note that a configuration without the display device 601, the input device 602, and the display memory 606 may also be adopted.

The first storage unit 110 is implemented by the non-volatile memory 604. Then, the program describing the processing procedure of the PLC stored in the non-volatile memory 604 is loaded into the volatile memory 605 and executed by the CPU 603, so that the first control unit 120 and the first communication unit 130 are implemented. The program can be recorded on a recording medium readable by the computer device 600 such as a hard disk, a compact disk (CD)-read only memory (ROM), a magneto-optical (MO) disk, or a digital versatile disc (DVD), or can be distributed via a network such as the Internet. In this case, the program is stored in the non-volatile memory 604 from an information processing terminal connected via the communication interface 608.

As described above, the first PLC 1 according to the first embodiment has the function of transmitting the hash value of the event history data to the other controller 30. That is, the first PLC 1 can cause the other controller 30 to store the hash value corresponding to the event occurring in the first PLC 1, whereby the hash value corresponding to the event occurring in the first PLC 1 can be shared by a plurality of devices. Thus, the first PLC 1 uses a verification device to compare two hash values corresponding to one event stored in the first PLC 1 and the other controller 30, thereby being able to verify whether or not the hash value stored in the first PLC 1 is the correct hash value recorded in the recording processing of the first PLC 1.

That is, the verification device is used to compare the hash values stored in a plurality of the other controllers 30 with the hash value stored in the first PLC 1, and the hash values stored in the plurality of other controllers 30 can be treated as the correct hash values if the hash values stored in the plurality of other controllers 30 are the same but are different from the hash value stored in the first PLC 1.

Moreover, the first PLC 1 uses the verification device to recalculate the hash value of the event history data stored in the first PLC 1 and compare the recalculated hash value with the hash value corresponding to the event history data stored in the other controller 30, thereby being able to verify whether or not the event history data stored in the first PLC 1 is the correct event history data recorded in the recording processing of the first PLC 1. That is, the event history data stored in the first PLC 1 is the correct event history data recorded in the recording processing of the first PLC 1 if the recalculated hash value is identical to the hash value corresponding to the event history data stored in the other controller 30.

The first PLC 1 can transmit the hash value of the previous event, the current event data, and the hash value of the current event each time the hash value is transmitted to the other controller 30. The other controller 30 can then verify that the actual data of the event history data and the hash value received are correct by recalculating the hash value using the actual data of the event history data.

If it is detected that the hash value stored in the first PLC 1 is not the correct hash value recorded in the recording processing of the first PLC 1, the verification device can recalculate the hash value of the event history data stored in the first PLC 1 by using the hash value stored in the other controller 30 as the correct hash value. Then, the verification device compares the recalculated hash value with the correct hash value corresponding to the event history data stored in the other controller 30, thereby being able to verify whether or not the event history data stored in the first PLC 1 is the correct event history data recorded in the recording processing of the first PLC 1. This enables verification of whether or not the event history data stored in the first PLC 1 is the correct event history data recorded in the recording processing of the first PLC 1 even when the hash value stored in the first PLC 1 has been falsified. In this case, if the recalculated hash value is different from the hash value stored in the other controller 30, the event history data stored in the first PLC 1 is not the correct event history data recorded in the recording processing of the first PLC 1 but has been falsified.

Note that the verification device described above can be implemented by the computer device 600 having the configuration illustrated in FIG. 16. That is, the function of the verification device can be implemented when a program describing the procedures of the processing such as the recalculation and the hash value comparison processing described above is loaded in the volatile memory 605 and executed by the CPU 603.

The first PLC 1 according to the first embodiment also has the function of storing the hash value transmitted from another PLC in the event history data. That is, the first PLC 1 can store the hash value corresponding to an event occurring in another PLC, whereby the hash value corresponding to the event occurring in the other PLC can be shared by the plurality of devices. The first PLC 1 can thus play a role as the other controller 30 for the other PLC.

The PLC system configured using the first PLC 1 described above can easily detect falsification of the hash value even when the hash value of the event stored in another PLC is falsified. Then, the PLC system configured using the first PLC 1 described above can verify whether or not the event history data stored in the first PLC 1 is the correct event history data recorded in the recording processing of the first PLC 1. In other words, when the hash values of the event history data are mutually saved within the PLC system, the chain of hash values of the event history data can be shared by the whole PLC system, the validity of the hash values and event history data can be verified, and data protection capable of withstanding falsification of the hash values can be realized. This eliminates the need for complicated processing such as encryption of hash values and consumption of computer resources.

Moreover, by combining the various functions described above, event history data having high data reliability can be collected in the whole system that is configured with an uncertain network while consuming almost no memory and computational effort that are computer resources for each PLC.

The configurations illustrated in the above embodiments merely illustrate examples of the content of the present invention, and can thus be combined with another known technique or partially omitted and/or modified without departing from the scope of the present invention.

REFERENCE SIGNS LIST 1 first PLC; 2 second PLC; 3 third PLC; 10 history collection storage; 20, 40, 70 communication line; 30 another controller; 50 network; 60 device to be controlled; 110 first storage unit; 111 first event history storage unit; 112 first hash value history storage unit; 113 first program storage unit; 120 first control unit; 121 first hash value calculation unit; 122 first anomaly detection unit; 130 first communication unit; 210 second storage unit; 211 second event history storage unit; 212 second hash value history storage unit; 213 second program storage unit; 220 second control unit; 221 second hash value calculation unit; 222 second anomaly detection unit; 230 second communication unit; 300, 400 PLC system; 500 event history server; 600 computer device; 601 display device; 602 input device; 603 CPU 604 non-volatile memory; 605 volatile memory; 606 display memory; 607 external memory interface; 608 communication interface; 609 bus; n n-th PLC.

The invention claimed is:

1. A control device for controlling a control target device, the control device comprising:
   hash value circuitry configured to calculate a first hash value on a basis of event history data of an event that occurs during operation of the control device;
   communicator circuitry configured to transmit the first hash value to a first another controller disposed external to the control device and receive a second hash value calculated on a basis of event history data of an event that occurs in a second another controller disposed outside the control device; and
   a memory to store the event history data of the event that occurs during operation of the control device, the first hash value, and the second hash value, wherein the event history data being combined data in which, for each of multiple events that occurs in the control device during operation, a first hash value calculated for a previous event is combined with event data indicating a content of the current event, the event data including the second hash value that is transmitted from the second another controller,
   the hash value circuitry forms a hash chain by generating a new first hash value on a basis of a latest event history data, and
   the first hash value stored in the memory is used for verification in verification circuitry that is different from any of the control device, the first another controller, and the second another controller, the verification circuitry comparing the first hash value with a hash value recorded in the first another controller or the second another controller and verifying whether the first hash value is a correct hash value calculated and stored by the control device.

2. The control device according to claim 1, further comprising
   anomaly detection circuitry to recalculate the first hash value on a basis of the event history data stored in the memory and detect an anomaly of the recalculated hash value.

3. The control device according to claim 1, wherein
   when storing the event history data, the memory stores the event history data and a hash value that is calculated on a basis of event history data of an event that occurs in the control device before the event history data.

4. A controller system, comprising:
   the control device, the first another controller, and the second another controller according to claim 1 which are configured to communicate with each other.

5. The controller system according to claim 4, further comprising:
   a current time management server that manages a current time and includes the first another controller and the second another controller.

6. The controller system according to claim 4, further comprising:
   an event history storage server that stores the event history data of the event that occurs during operation of the control device and includes the first another controller and the second another controller.

7. The controller system according to claim 4, further comprising:
   the verification circuitry different from any of the control device, the first another controller, and the second another controller, wherein
   the verification circuitry compares the first hash value with a hash value recorded in the first another controller or the second another controller, and verifies whether the first hash value stored in the memory is a correct hash value calculated and stored by the control device.

8. A controller system, comprising:
   a plurality of the control devices according to claim 1 which are connected to communicate with each other,
   wherein the control devices each store the first hash value calculated by the hash value circuitry and a second hash value calculated by a hash value circuitry of at least another one of the control devices.

9. The controller system according to claim 8, further comprising:
   verification circuitry different from any of the plurality of the control devices, wherein
   the verification circuitry compares the first hash value calculated by the hash value circuitry of one of the plurality of the control devices with a hash value recorded in another one of the plurality of the control devices, and verifies whether the first hash value stored in a memory of the one of the plurality of the control devices is a correct hash value calculated and stored by the one of the plurality of the control devices.

* * * * *